US011812515B2

(12) United States Patent
Rice et al.

(10) Patent No.: US 11,812,515 B2
(45) Date of Patent: *Nov. 7, 2023

(54) MULTIPLE ACTIVE NETWORK WIRELESS DEVICE USING A SHADOW NUMBER

(71) Applicant: InterMetro Communications, Inc., Simi Valley, CA (US)

(72) Inventors: Charles Rice, Simi Valley, CA (US); Christopher Fogel, Simi Valley, CA (US)

(73) Assignee: InterMetro Communications, Inc., Simi Valley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/869,431

(22) Filed: May 7, 2020

(65) Prior Publication Data

US 2020/0374979 A1    Nov. 26, 2020

Related U.S. Application Data

(63) Continuation-in-part of application No. 16/690,011, filed on Nov. 20, 2019, now Pat. No. 11,013,064, (Continued)

(51) Int. Cl.
*H04W 88/06* (2009.01)
*H04W 8/18* (2009.01)
(Continued)

(52) U.S. Cl.
CPC .......... *H04W 88/06* (2013.01); *H04B 1/3816* (2013.01); *H04B 17/318* (2015.01);
(Continued)

(58) Field of Classification Search
CPC . H04W 88/06; H04W 8/183; H04W 36/0069; H04W 48/18; H04W 72/1242;
(Continued)

(56) References Cited

U.S. PATENT DOCUMENTS

| 5,915,214 A | 6/1999 | Reece et al. |
| 6,615,044 B2 | 9/2003 | Tigerstedt et al. |

(Continued)

FOREIGN PATENT DOCUMENTS

| CA | 3098896 | 11/2019 |
| CN | 101867979 A | 10/2010 |

(Continued)

OTHER PUBLICATIONS

Partial Supplementary European Search Report in European Application No. 19796576.7, dated Feb. 4, 2022 in 14 pages.

(Continued)

*Primary Examiner* — Marisol Figueroa
(74) *Attorney, Agent, or Firm* — Knobbe, Martens, Olson & Bear, LLP

(57) ABSTRACT

A wireless device capable of using multiple SIM cards to simultaneously communicate with multiple cellular networks is presented. The wireless device is a dual-SIM dual-data active device that is capable of receiving and transmitting data packets over multiple cellular networks simultaneously or at substantially the same time. The wireless device may include a second set of antennas and internal hardware, including a second model and processor enabling the wireless device to communicate with at least two cellular networks. The wireless device may select a cellular network to perform a task, such as complete a call or download a video based on a difference in signal strength between the two or more cellular networks supported by the wireless device.

16 Claims, 20 Drawing Sheets

Related U.S. Application Data which is a continuation of application No. 16/399,796, filed on Apr. 30, 2019, now Pat. No. 10,506,666.

(60) Provisional application No. 62/846,510, filed on May 10, 2019, provisional application No. 62/836,571, filed on Apr. 19, 2019, provisional application No. 62/665,103, filed on May 1, 2018.

(51) Int. Cl.
| | | |
|---|---|---|
| *H04W 36/00* | (2009.01) | |
| *H04W 48/18* | (2009.01) | |
| *H04B 1/3816* | (2015.01) | |
| *H04B 17/318* | (2015.01) | |
| *H04W 72/566* | (2023.01) | |

(52) U.S. Cl.
CPC ....... *H04W 8/183* (2013.01); *H04W 36/0069* (2018.08); *H04W 48/18* (2013.01); *H04W 72/569* (2023.01)

(58) Field of Classification Search
CPC .... H04W 24/08; H04W 36/30; H04B 1/3816; H04B 17/318
See application file for complete search history.

(56) References Cited

U.S. PATENT DOCUMENTS

| | | | |
|---|---|---|---|
| 6,778,830 B1 | 8/2004 | Oizumi et al. | |
| 6,836,471 B2 | 12/2004 | Holma et al. | |
| 6,845,238 B1 | 1/2005 | Muller | |
| 7,319,871 B2 | 1/2008 | Sliva | |
| 7,346,351 B2 | 3/2008 | Shin | |
| 7,515,909 B2 | 4/2009 | Jain et al. | |
| 8,089,934 B2 | 1/2012 | Long et al. | |
| 8,170,564 B2 | 5/2012 | Sugiura et al. | |
| 8,744,445 B2 | 6/2014 | Wu | |
| 8,811,991 B2 | 8/2014 | Jain et al. | |
| 8,897,265 B2 | 11/2014 | Kashimba et al. | |
| 9,124,957 B1 | 9/2015 | Fogel et al. | |
| 10,506,666 B2 * | 12/2019 | Rice | H04B 1/3816 |
| 11,013,064 B2 | 5/2021 | Rice et al. | |
| 2004/0192294 A1 | 9/2004 | Pan et al. | |
| 2008/0242320 A1 | 10/2008 | Dennert et al. | |
| 2009/0103597 A1 * | 4/2009 | Choi | H04W 52/0245 375/222 |
| 2009/0186651 A1 | 7/2009 | You | |
| 2010/0020793 A1 | 1/2010 | Croak et al. | |
| 2011/0055434 A1 | 3/2011 | Pyers et al. | |
| 2011/0201336 A1 | 8/2011 | Garrett et al. | |
| 2011/0310865 A1 | 12/2011 | Kennedy et al. | |
| 2013/0210421 A1 | 8/2013 | Mohseni et al. | |
| 2013/0295986 A1 | 11/2013 | Mueck | |
| 2013/0329639 A1 | 12/2013 | Wietfeldt | |
| 2014/0200807 A1 | 7/2014 | Geisberger | |
| 2015/0017962 A1 | 1/2015 | Howard et al. | |
| 2015/0094071 A1 | 4/2015 | Hang et al. | |
| 2015/0282057 A1 | 10/2015 | Li et al. | |
| 2015/0289221 A1 | 10/2015 | Nayak et al. | |
| 2016/0029274 A1 | 1/2016 | Ng et al. | |
| 2016/0119469 A1 | 4/2016 | Schei et al. | |
| 2016/0219421 A1 | 7/2016 | Shi et al. | |
| 2016/0226539 A1 | 8/2016 | Batchu | |
| 2016/0353316 A1 | 12/2016 | Boettger et al. | |
| 2016/0373948 A1 | 12/2016 | Sanka et al. | |
| 2017/0048773 A1 | 2/2017 | Miao et al. | |
| 2017/0223313 A1 | 8/2017 | Chong et al. | |
| 2017/0314940 A1 | 11/2017 | Dave et al. | |
| 2017/0366955 A1 | 12/2017 | William | |
| 2018/0184309 A1 | 6/2018 | Bhardwaj | |
| 2019/0043372 A1 | 2/2019 | Winkle et al. | |
| 2019/0234750 A1 | 8/2019 | Muldoon et al. | |
| 2019/0342943 A1 | 11/2019 | Rice et al. | |
| 2020/0329528 A1 | 10/2020 | Rice et al. | |
| 2022/0053607 A1 | 2/2022 | Rice et al. | |

FOREIGN PATENT DOCUMENTS

| | | | |
|---|---|---|---|
| CN | 104883673 A | 9/2015 | |
| CN | 104982050 A | 10/2015 | |
| CN | 205071326 U | 3/2016 | |
| CN | 107911856 A | 4/2018 | |
| CN | 112314049 A | 2/2021 | |
| EP | 1182900 B1 | 4/2004 | |
| EP | 0676907 B1 | 6/2004 | |
| EP | 1762105 A2 | 3/2007 | |
| EP | 1363472 B1 | 7/2008 | |
| EP | 1973368 A2 | 9/2008 | |
| EP | 2509349 A1 | 10/2008 | |
| EP | 2083576 A1 | 7/2009 | |
| EP | 2098022 A1 | 9/2009 | |
| EP | 1843614 B1 | 3/2011 | |
| EP | 1671496 B1 | 4/2012 | |
| EP | 2461627 A1 | 6/2012 | |
| EP | 1041837 B1 | 12/2012 | |
| EP | 2633628 A1 | 9/2013 | |
| EP | 2833601 A2 | 2/2015 | |
| EP | 3788840 | 3/2021 | |
| JP | 2012-170090 A | 9/2012 | |
| JP | 2015-527774 A | 9/2015 | |
| JP | 2021-523657 | 9/2021 | |
| KR | 627804 B1 | 9/2006 | |
| KR | 10-2017-0141550 A | 12/2017 | |
| KR | 10-2017-0141998 A | 12/2017 | |
| KR | 10-2017-0142401 A | 12/2017 | |
| KR | 10-2021-0008477 | 1/2021 | |
| RU | 2491718 C2 | 8/2013 | |
| RU | 2754353 | 9/2021 | |
| TW | 202005319 | 1/2020 | |
| TW | 2021/01923 | 1/2021 | |
| WO | WO 2000018170 A1 | 3/2000 | |
| WO | WO-2007047580 A2 * | 4/2007 | ........ H04M 3/42008 |
| WO | WO 2009017133 A1 | 2/2009 | |
| WO | WO 2014032570 A1 | 3/2014 | |
| WO | WO 2016/023002 A1 | 11/2016 | |
| WO | WO 2017/100473 A1 | 6/2017 | |
| WO | WO-2017209693 A1 * | 12/2017 | .............. H04W 4/12 |
| WO | WO 2019/213117 A1 | 11/2019 | |
| WO | WO 2020/231758 | 11/2020 | |

OTHER PUBLICATIONS

VoLTE with SRVCC: The second phase of voice evolution for mobile LTE devices, Qualcommm Oct. 2012, in 10 pages.
Inter-System Handover Parameter Optimization, Qualcomm, IEEE Vehicular Technology Conference, Sep. 25-28, 2006 C. Brunner, A. Garavaglia, M. Mittal, M. Narang and J. V. Bautista, "Inter-System Handover Parameter Optimization," *IEEE Vehicular Technology Conference*, Montreal, Que., 2006, pp. 1-6. doi: 10.1109/VTCF. 2006.232.
Interoperable UE Handovers in LTE, Radisys, Sep. 2011, in 11 pages.
International Search Report dated Jul. 23, 2019 in International Patent Application No. PCT/US2019/029972 in 5 pages.
Written Opinion dated Jul. 23, 2019 in International Patent Application No. PCT/US2019/029972 in 4 pages.
International Search Report dated Jun. 26, 2020 for International Patent Application No. PCT/US2020/031945, filed on May 7, 2020.
Written Opinion dated Jun. 26, 2020 for International Patent Application No. PCT/US2020/031945, filed on May 7, 2020.
Russian Search Report received in Russian Application No. 2020138945 dated Jan. 28, 2020 in 4 pages.
International Search Report and Written Opinion dated Jan. 28, 2022 in International Patent Application No. PCT/US2021/072093.
Extended European Search Report in European Application No. 19796576.7 dated Jun. 14, 2022 in 16 pages.

* cited by examiner

MULTIPLE ACTIVE NETWORK WIRELESS DEVICE USING A SHADOW NUMBER

RELATED APPLICATIONS

This application is a continuation-in-part of U.S. application Ser. No. 16/690,011, filed Nov. 20, 2019 and titled "MULTIPLE ACTIVE NETWORK WIRELESS DEVICE," the disclosure of which is hereby incorporated by reference in its entirety, and which is a continuation of U.S. application Ser. No. 16/399,796, which was filed on Apr. 30, 2019 and is titled "MULTIPLE ACTIVE NETWORK WIRELESS DEVICE," the disclosure of which is expressly incorporated by reference herein in its entirety for all purposes, and which claims priority to U.S. Provisional Application No. 62/665,103, which was filed on May 1, 2018 and is titled "SYSTEM AND METHOD FOR MULTI-NETWORK DYNAMIC ROUTING," the disclosure of which is expressly incorporated by reference herein in its entirety for all purposes. Further, U.S. application Ser. No. 16/399,796 also claims priority to U.S. Provisional Application No. 62/836,571, which was filed on Apr. 19, 2019 and is titled "MULTIPLE ACTIVE NETWORK WIRELESS DEVICE," the disclosure of which is expressly incorporated by reference herein in its entirety for all purposes. This application also claims priority to U.S. Provisional Application No. 62/846,510, which was filed on May 10, 2019 and is titled "MULTIPLE ACTIVE NETWORK WIRELESS DEVICE," the disclosure of which is expressly incorporated by reference herein in its entirety for all purposes. Any and all applications, if any, for which a foreign or domestic priority claim is identified in the Application Data Sheet of the present application are hereby incorporated by reference in their entireties under 37 CFR 1.57. Further, this application incorporates by reference in its entirety for all purposes U.S. application Ser. No. 13/367,133 (now U.S. Pat. No. 9,124,957), which was filed on February 6, 2012 and is titled "SYSTEM AND METHOD FOR DYNAMIC MULTIFACTOR ROUTING."

BACKGROUND

Network protocols can be used to connect devices for mobile communications. One way of connecting devices is using the Global System for Mobile Communications (GSM) architecture and/or standard, which may employ time-division multiple-access (TDMA) protocols. Voice from one device can be transformed into digital data, and given a channel and a time slot. The receiving device can listen to the voice during the assigned time slot. Some network protocols that compete with GSM implement Code-Division Multiple Access (CDMA), which can connect calls using a code division system. Call data may be encoded with a unique key and multiple call data may be transmitted at once. The receiving device may use the unique key to identify the data associated with the specific call to which the receiving device is connected.

SUMMARY

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

Certain aspects of the present disclosure relate to a wireless device configured to maintain communication channels over multiple data networks with each data network configured using a different communication technology or set of frequency bands. The wireless device may include: a first primary antenna configured to transmit signals of a first transmit band and receive signals of a first receive band, and to transmit signals of a second transmit band and received signals of a second transmit band; a first diversity antenna configured to receive the signals of the first receive band, and receive the signals of the second receive band; a first radio frequency subsystem in electrical communication with the first primary antenna and the first diversity antenna, the first radio frequency subsystem configured to decode the signals of the first receive band and to decode the signals of the second receive band; a second radio frequency subsystem in electrical communication with the first diversity antenna, the second radio frequency subsystem configured to decode the signals of the first receive band and to decode the signals of the second receive band; and a hardware processor in electrical communication with a first subscriber identity module, a second subscriber identity module, the first radio frequency subsystem, and the second radio frequency subsystem, wherein the first subscriber identity module is associated with a first wireless network that supports the first transmit band and the first receive band, and the second subscriber identity module is associated with a second wireless network that supports the second transmit band and the second receive band, and wherein the hardware processor is configured to control whether the first subscriber identity module or the second subscriber module uses the first radio frequency subsystem to communicate at a particular time period.

The wireless device of the preceding paragraph can include any combination or sub-combination of the following features: where the wireless device further includes a first modem connected between the first radio frequency subsystem and the hardware processor, the first modem configured to transmit a packet using the first primary antenna to the first wireless network or the second wireless network; where the first modem is configured to determine whether the packet is a voice packet or a data packet; where the wireless device further includes: a first modem connected between the first radio subsystem and the hardware processor, the first modem configured to transmit a packet using the first primary antenna to one of the first wireless network or the second wireless network; and a second modem connected to the hardware processor, the second modem configured to transmit the packet using a second primary antenna; where the second modem is integrated with a second hardware processor configured to manage communication with a third wireless network; where the hardware processor serves as a primary device and the second hardware processor serves as a secondary device in a primary/secondary communication model; where the second modem is connected to the hardware processor via an auxiliary port of the hardware processor; where the wireless device further includes a communication hub configured to connect the second modem to the hardware processor; where the communication hub connects between an external data transfer or charging port of the wireless device and a data transfer or charging port of the hardware processor; where the second radio frequency subsystem is configured to receive the signals of the first receive band or the signals of the second receive band, and wherein the second radio frequency subsystem does not transmit signals; where the wireless device further includes a tuner in electrical communication with the first radio frequency subsystem, the first tuner configured to determine whether a received signal is a signal of a first channel access method or a signal of a second channel access method; where the first channel access method comprises one of code-division multiple access, wideband code-division multiple access, or time-division multiple access, and the second channel access method comprises one of code-division multiple access, wideband code-division multiple access, or time-division multiple access; where the hardware processor is further configured to determine a first signal strength of a connection with the first wireless network and a second signal strength of a connection with the second wireless network based at least in part on the received signals of the first receive band, and the received signals of the second receive band; where the hardware processor is further configured to determine whether to communicate with the first wireless network or the second wireless network based at least in part on the first signal strength or the second signal strength; and where the first wireless network is implemented using a first communication technology and is associated with a first service provider, and the second wireless network is implemented using a second communication technology and is associated with a second service provider.

Certain aspects of the present disclosure relate to a wireless device configured to maintain communication channels over multiple data networks with each data network configured using a different communication technology or set of frequency bands. The wireless device may include: a first primary antenna configured to transmit signals of a first transmit band and receive signals of a first receive band, and to transmit signals of a second transmit band and received signals of a second transmit band; a first diversity antenna configured to receive the signals of the first receive band, and receive the signals of the second receive band; a first radio frequency subsystem in electrical communication with the first primary antenna and the first diversity antenna, the first radio frequency subsystem configured to decode the signals of the first receive band and to decode the signals of the second receive band; a second radio frequency subsystem in electrical communication with the first diversity antenna, the second radio frequency subsystem configured to decode the signals of the first receive band and to decode the signals of the second receive band; and a hardware processor in electrical communication with a first subscriber identity module, a second subscriber identity module, the first radio frequency subsystem, and the second radio frequency subsystem, wherein the first subscriber identity module is associated with a first wireless network that supports the first transmit band and the first receive band, and the second subscriber identity module is associated with a second wireless network that supports the second transmit band and the second receive band, wherein the hardware processor is configured to control whether the first subscriber identity module or the second subscriber module uses the first radio frequency subsystem to communicate at a particular time period, and wherein the hardware processor causes output of a shadow number when establishing a call over the first wireless network using the first subscriber identity module or when establishing the call over the second wireless network using the second subscriber identity module, and wherein the shadow number substitutes at least for a first number associated with the first subscriber identity module and for a second number associated with the second subscriber identity module.

The wireless device of the preceding paragraph can include any combination or sub-combination of the following features: where the wireless device further includes a first modem connected between the first radio frequency subsystem and the hardware processor, the first modem configured to transmit a packet using the first primary antenna to the first wireless network or the second wireless network; where the first modem is configured to determine whether the packet is a voice packet or a data packet; where the wireless device further includes: a first modem connected between the first radio subsystem and the hardware processor, the first modem configured to transmit a packet using the first primary antenna to one of the first wireless network or the second wireless network; and a second modem connected to the hardware processor, the second modem configured to transmit the packet using a second primary antenna; where the second modem is integrated with a second hardware processor configured to manage communication with a third wireless network; where the hardware processor serves as a primary device and the second hardware processor serves as a secondary device in a primary/secondary communication model; where the second modem is connected to the hardware processor via an auxiliary port of the hardware processor; where the wireless device further includes a communication hub configured to connect the second modem to the hardware processor; where the communication hub connects between an external data transfer or charging port of the wireless device and a data transfer or charging port of the hardware processor; where the second radio frequency subsystem is configured to receive the signals of the first receive band or the signals of the second receive band, and wherein the second radio frequency subsystem does not transmit signals; where the wireless device further includes a tuner in electrical communication with the first radio frequency subsystem, the first tuner configured to determine whether a received signal is a signal of a first channel access method or a signal of a second channel access method; where the first channel access method comprises one of code-division multiple access, wideband code-division multiple access, or time-division multiple access, and the second channel access method comprises one of code-division multiple access, wideband code-division multiple access, or time-division multiple access; where the hardware processor is further configured to determine a first signal strength of a connection with the first wireless network and a second signal strength of a connection with the second wireless network based at least in part on the received signals of the first receive band, and the received signals of the second receive band; where the hardware processor is further configured to determine whether to communicate with the first wireless network or the second wireless network based at least in part on the first signal strength or the second signal strength; and where the first wireless network is implemented using a first communication technology and is associated with a first service provider, and the second wireless network is implemented using a second communication technology and is associated with a second service provider.

Certain aspects of the present disclosure relate to a method of communicating over multiple cellular networks. The method may be performed by a hardware processor of a wireless device configured to communicate with a first cellular network over a first frequency band and a second cellular network over a second frequency band. The method may include: receiving, via a first primary antenna of the wireless device, a first signal of the first frequency band from the first cellular network, wherein the first cellular network is associated with a first subscriber identity module of the wireless device and the second cellular network is associated with a second subscriber identity module of the wireless device, and wherein the first subscriber identity module is designated for transmission of data packets; receiving, via a first diversity antenna of the wireless device, a second signal of the second frequency band from the second cellular network; determining a first signal strength associated with the first cellular network based at least in part on the first signal; determining a second signal strength associated with the second cellular network based at least in part on the second signal; determining that the second signal strength exceeds the first signal strength; and transmitting first data packets via the first primary antenna to a target system over the second cellular network by designating the second subscriber identity module as the active subscriber identity module for transmitting the first data packets and designating the first subscriber identity module as not for transmitting the first data packets, wherein the first data packets identify the origin of the first data packets as being associated with a shadow number that substitutes at least for a first number associated with the first subscriber identity module and for a second number associated with the second subscriber identity module.

The method of the preceding paragraph can include any combination or sub-combination of the following features: where the first signal and the second signal are received during a first time period; where the method further includes: receiving, at a second time period, a third signal of the first frequency band from the first cellular network; receiving, at the second time period, a fourth signal of the second frequency band from the second cellular network; determining a third signal strength associated with the first cellular network based at least in part on the third signal; determining a fourth signal strength associated with the second cellular network based at least in part on the fourth signal; determining that the third signal strength exceeds the fourth signal strength; and transmitting second data packets via the first primary antenna to the target system over the first cellular network by designating the first subscriber identity module as the active subscriber identity module for transmitting the second data packets and designating the second subscriber identity module as not for transmitting the second data packets; where the first data packets are associated with non-voice data, and wherein the method further comprises: obtaining second data packets from an application; determining that the second data packets comprise voice data associated with a call to a destination wireless device; and transmitting the second data packets over the first cellular network associated with the first subscriber identity module while continuing to transmit data packets associated with non-voice data over the second cellular network; and where the method further includes receiving via a second primary antenna of the wireless device, a third signal of a third frequency band associated with a third cellular network; determining a third signal strength associated with the third cellular network based at least in part on the third signal; determining that the third signal strength exceeds the second signal strength; transmitting second data packets associated with a first priority over the third cellular network; and transmitting the first data packets over the second cellular network, wherein the first data packets are associated with a second priority that is lower than the first priority.

Certain aspects of the present disclosure relate to a dynamic routing system. The dynamic routing system may include a memory configured to store computer-executable instructions and a hardware processor in communication with the memory and configured to execute the specific computer-executable instructions to at least: receive a packet associated with a call from a wireless device associated with an origin caller; identify an origin number associated with the call from the packet; determine that the origin number is associated with a shadow number of the origin caller; determine a plurality of phone numbers associated with the shadow number; identify a plurality of call carriers, wherein each call carrier of the plurality of call carriers is associated with a different number of the plurality of phone numbers; select a call carrier from the plurality of call carriers based at least in part on one or more routing parameters; and route the packet over a network of the selected call carrier while maintaining the shadow number at the origin number for display at a device associated with a destination target of the packet. The dynamic routing system can be a gateway configured to route calls between carrier networks and/or between an origin and destination caller.

The dynamic routing system of the preceding paragraph can include any combination or sub-combination of the following features: where the packet is one of a data packet or a voice packet; where the device is further configured to execute the specific computer-executable instructions to at least: determine a destination number for the packet, the destination number associated with the destination target of the packet; determine that the destination number is associated with a second shadow number, wherein the shadow number is associated with the origin caller and the second shadow number is associated with a target user associated with the destination target; substitute the destination number with the second shadow number; and route the packet over the network of the selected call carrier using the second shadow number in place of the destination number.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

Introduction

Figure 1:
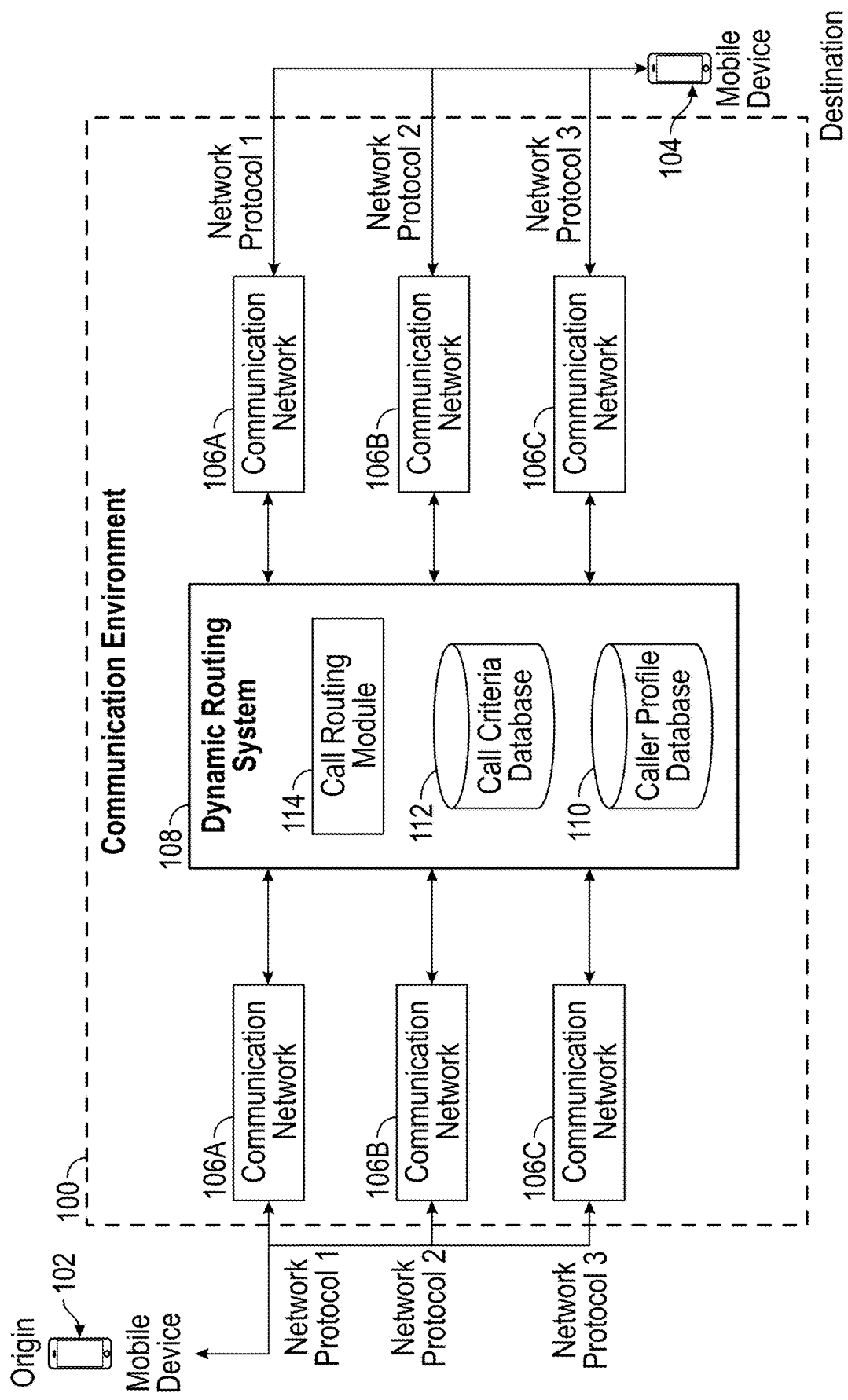
FIG. 1 illustrates an embodiment of a communications environment in accordance with the teachings of the present disclosure.

A number of routing systems decide how to route calls based on a single type of network protocol. In many cases, the communications devices are able to support a single type of network protocol, such as CDMA or GSM, which may implement a TDMA protocol or a CDMA protocol, or a subset of frequency bands used in cellular communication. In some embodiments, network protocols can include other network protocols that can be used to provide communication services to multiple users in a wired or wireless medium, such as frequency division multiple access (FDMA), orthogonal frequency division multiple access (OFDMA), spatial division multiple access (SDMA), WiFi technology, Bluetooth, Digital Enhanced Cordless Telecommunications (DECT), Near Field Communications (NFC), ZigBee, WiGig, Long-Term Evolution (LTE), and/or the like. In some such cases, the routing systems can route calls from one communications network provider to another communications network provider within the same network that implements the same type of network protocol. Limiting the routing of calls to communications network providers associated with networks using the same type of network protocol limits the availability of networks available for the call. Some networks that implement particular network protocols may provide better network connectivity at particular geographic or network locations than other networks that implement other network protocols. For example, a GSM network may provide better service than a CDMA network at a particular location. Furthermore, if many calls are made using the same network in a particular area, the network may suffer decreased performance.

This disclosure describes a number of systems and associated processes that can dynamically route calls over one or more communication networks, which may be provided by one or more communication network providers. The communication networks may implement different network protocols, such as CDMA or GSM. Further, some communication networks may utilize the same network protocol, but using different frequency bands. Moreover, this disclosure describes certain criteria that can be used to automatically identify the appropriate network for a call based on the criteria. In some cases, the criteria may include a geographical location, which may be associated with a particular network. In some such cases, a mobile device that can support multiple protocols may have increased options for networks that can process a call compared to traditional communication systems.

Further, this disclosure describes a number of systems and associated processes that enable pattern recognition and profiling of certain call patterns that can be used to determine an optimal network for a call. In certain embodiments, determining a network over which to route a call can be based at least in part on network characteristics of both the source and destination devices of the call. Advantageously, in some embodiments, a dynamic routing system can route calls that were initially established with a first communications network implementing a first network protocol, which may implement GSM, to a second communications network implementing a second network protocol, which may implement CDMA. As such, if one network using one network protocol has reduced network performance, the call can be rerouted over a different network using another network protocol, which may be owned or maintained by a different communications network provider. These and other features are described in greater detail below with respect to the figures.

Example Communications Environment

FIG. 1 illustrates an embodiment of a communications environment 100 in accordance with the teachings of the present disclosure. In the communications environment 100, a mobile device 102 can make a call to a mobile device 104. In the illustrated example, the mobile device 102 may be associated with a user who is initiating a call and may be referred to as the origin of the call, and the mobile device 104 may associated with a user who the caller desires to call and may be referred to as the target or destination for the call. However, it should be understood that the roles of the users, and consequently the roles of the mobile devices 102 and 104 may be reversed. The call is not limited in type and can include any type of call that may be performed over one or more communication networks that may implement one or more different communication protocols. For example, the call can be: a telephone call placed via mobile phone, a Voice over Internet Protocol (VoIP) call, or a modem call, to name a few. Further, the mobile device 102 and the mobile device 104 can include any user or organization capable of placing the call.

To establish the call connection between the mobile device 102 and the mobile device 104, the call may be routed over one or more different communication networks provided or maintained by one or more communication network providers. In some cases, each communication network may be owned or maintained by a different communication network provider. However, in some embodiments, multiple communication networks may be maintained by a single communication network provider. For example, a provider may maintain a 3G and 4G network. Further, the provider may be implementing a 5G network. Each of the 3G, 4G, or 5G networks may implement versions of the same communication profile or may implement different communication profiles.

In one embodiment, the call is routed to a dynamic routing system 108. The dynamic routing system 108 can determine one or more network protocols that are supported by a network 106 of a communications network provider. The communications environment illustrated three communication networks 106A, 106B, 106C, which may individually be referred to as a communication network 106 or collectively referred to as communication networks 106. For example, the dynamic routing system 108 may determine that a communication network 106A can implement a network protocol 1, a communications network 106B can implement a network protocol 2, and a communication network 106C can implement a network protocol 3. In some embodiments, the communication network 106A and 106C may both implement the network protocol 1, but using different frequency spectrums or bands. The dynamic routing system 108 can be associated with one or more of the communication network providers or with any entity that can offer systems or services for facilitating optimal or improved routing over one or more of the communication networks based on one or more routing criteria. For example, the dynamic routing system 108 may be configured to provide optimal or improved routing based on a criteria of improving call signal strength for calls or reducing dropped call rates for calls. Further, each communication network 106 can include a number of computing devices and/or telephony devices, such as session border controls and gateways, to facilitate communications within the communication network 106, between a plurality of communication networks 106, and/or with the dynamic routing system 108. Some non-limiting examples of these computing devices are illustrated in FIG. 1 with respect to the dynamic routing system 108 and are described further below. Although FIG. 1 illustrates a particular embodiment of a configuration of the communications environment 100, other configurations are possible. For example, other embodiments of the communications environment 100 may enable routing of calls directly to the dynamic routing system 108 prior to the calls being routed to a communication network 106. In some embodiments, the communications networks 106 can communicate directly with other communication networks.

In certain embodiments, when routing a call, the dynamic routing system 108 can determine a network 106 to route the call based on a number of factors. These factors can include, for example: the origin of the call; the destination of the call; the price charged to the dynamic routing system 108 to route a call over a communication network 106 and/or the price charged by the dynamic routing system 108 to receive a call from a communication network 106; network characteristics; geolocation of a caller; a pattern in historical call data; and/or the like. Some of these factors are discussed in more detail below.

In FIG. 1, several potential communication paths exist to connect the mobile device 102 to the mobile device 104 via the communications network providers 106 and the dynamic routing system 108. For example a call from the mobile device 102 may be routed from the communications network 106A to the dynamic routing system 108, from the dynamic routing system 108 to the communications network 106C, and then from the communications network 106C to the mobile device 104. In some embodiments, the call from the mobile device 102 may be initially routed from the communications network 106A to the dynamic routing system 108. The dynamic routing system 108, based on one or more routing criteria, may subsequently instruct the mobile device 102 to use the communication network 106B to complete the call. Completing the call with the communications network 106B may include initiating a new call to the mobile device 104 using the communication network 106B. In certain embodiments, the initial call to the dynamic routing system 108 and the subsequent call to the mobile device 104 may occur with or without knowledge of the user initiating the call on the mobile device 102. Although a limited number of communication networks and call paths are illustrated in FIG. 1, it is possible for additional paths via additional communication networks to exist to connect the mobile device 102 with the mobile device 104. Further, note that although only one dynamic routing system 108 is illustrated, it is possible for multiple dynamic routing systems 108 to exist and for each dynamic routing system 108 to communicate with a number of communication networks, such as the communications network providers 106 in FIG. 1 and other dynamic routing systems 108.

In some embodiments, the dynamic routing system 108 includes a call routing module 114, a call criteria database 112, and a caller profile database 110. In some implementations, the dynamic routing system 108 may include multiple call routing modules 114, call criteria databases 112, and/or caller profile databases 110. Although illustrated as subsystems, it is possible in some embodiments for the call routing module 114, call criteria database 112, and/or caller profile database 110 to be separate systems that are external to the dynamic routing system 108 and with which the dynamic routing system 108 may communicate. The call criteria database 112 can include or store criteria for selecting a network using a particular network protocol by the call routing module 114, as described further herein. The caller profile database 110 can store profile information of a caller, such as historical call data, a pattern identified for callers, geolocation of the caller, and/or the like.

The call routing module 114 can route a call initiated by the mobile device 102 across one or more communication networks 106. To determine the one or more communication networks 106 upon which to route the call, the call routing module 114 can identify or determine call information associated with the call and use the identified information to facilitate selection of communication network 106. The call information may include network characteristics such as throughput and latency, supported network protocols of the mobile devices and/or available communication networks for the call, supported communication frequencies, and/or the like. Further, in some embodiments, the call information may include price or rate information for a cell phone plan of the caller user and/or the recipient user, and/or price or rate information for one or more of the communication networks to route the call on behalf of the dynamic routing system 108 or the one or more other communication networks.

The call routing module 114 can include any system that can receive a call and determine where to route the call. The call may be received from a communications network 106, an entity and/or processor associated with the communications network 106, the mobile device 102, the mobile device 104, the dynamic routing system 108, or any other system capable of providing the call to the call routing module 114. Further, the call routing module 114 can include any system that can provide and/or route a call to another system. This call can be provided to a communications network 106, an entity and/or processor associated with the communications network provider 106, the mobile device 102, the mobile device 104, and/or any other system capable of receiving the call from the call routing module 114. In addition, the call routing module 114 can include any system capable of providing and/or receiving call information associated with a call.

The call routing module 114 can prioritize and/or rank certain communications networks 106 or provider of communication networks. The call routing module 114 can include any system capable of receiving call information associated with a call and/or determining a ranked order routing list of networks 106 and/or communications network providers to which to route the call. For example, the call routing module 114 can be implemented by one or more computing systems and each computing system can include one or more processors. In certain embodiments, the call routing module 114 can implement one or more of the systems and/or perform one or more of the processes for routing a call that is disclosed in U.S. Pat. No. 9,124,957, issued on Sep. 1, 2015 and titled "SYSTEM AND METHOD FOR DYNAMIC MULTIFACTOR ROUTING," the entire disclosure of which is hereby incorporated by reference herein for all purposes.

In some embodiments, the call routing module 114 can rank a number of communications networks 106 to process a call. The call routing module 114 can receive call information associated with the call. Using the call information, the call routing module 114 can perform one or more ranking processes to determine a ranked routing list of communication networks. The ranked routing list can indicate a ranked order for communication networks and/or communication network providers that are capable of routing the call and that satisfy a set of network selection criteria. The call routing module 114 can include any system capable of determining the ranked order routing list for a call based on a number of criteria or factors. The call routing module 114 can rank the available networks 106 and/or communications network providers based on certain weighted values for the networks and/or communications network providers. For example, the weightings can be determined based on a network throughput capability, a price or profit margin when using a network and/or the communication network provider, a caller profile retrieved from the caller profile database 110, a certain criteria of a call retrieved from the call criteria database 112, such as a geographical location, a current number of calls routed to the network 106, a network and/or associated communication network provider rating, and/or the like.

Call Routing

Figure 2:
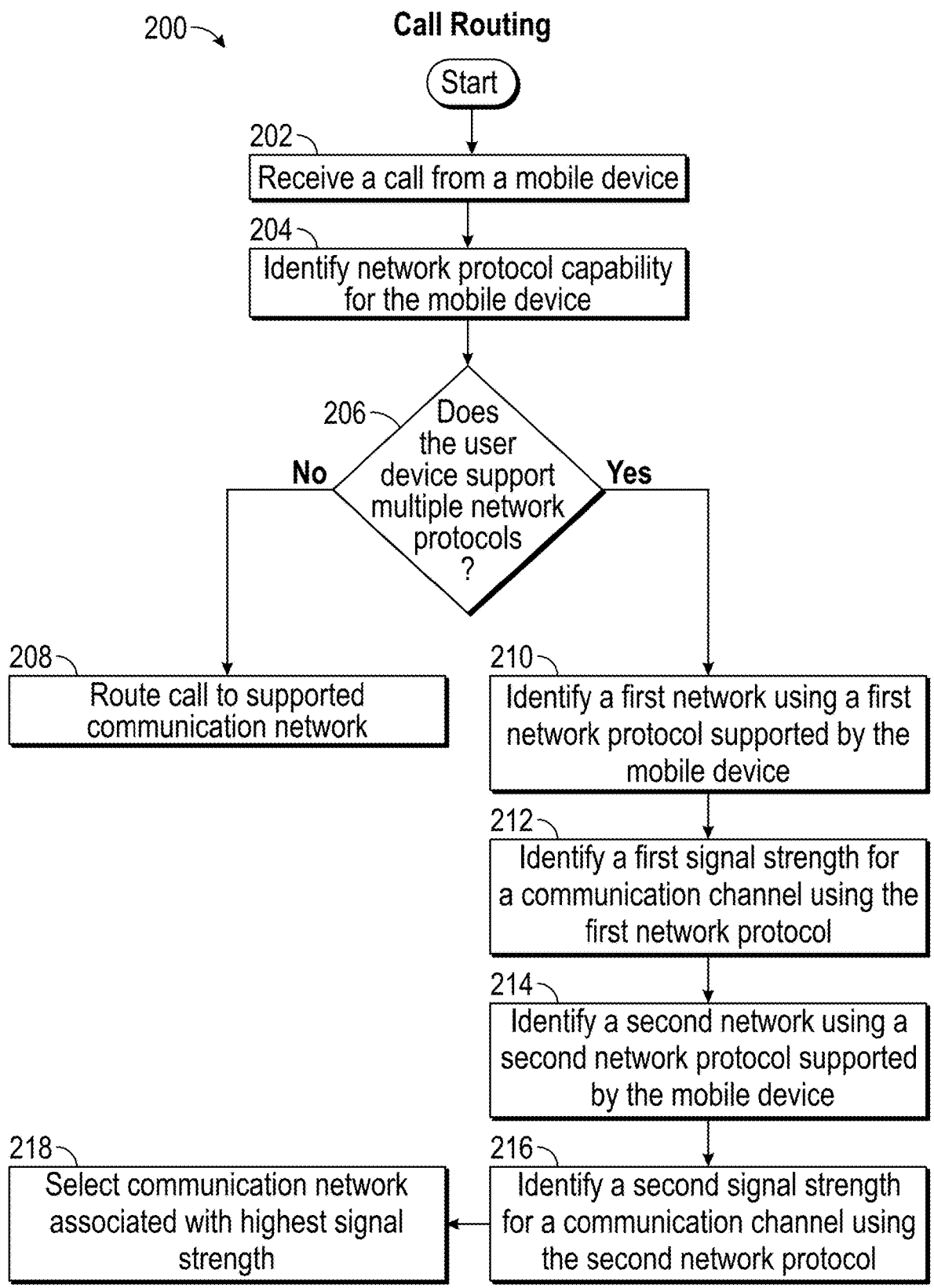
FIG. 2 illustrates a flow diagram for one embodiment of a dynamic call routing process in accordance with the teachings of the present disclosure.

FIG. 2 illustrates a flow diagram for one embodiment of a dynamic call routing process 200 in accordance with the teachings of the present disclosure. The process 200 can be performed by any system capable of routing a call including a communications network 106 that initially received a call from the mobile device 102, a communications network provider 106 that completed the final call connection to the mobile device 104, a communications network between an initial network that received that call and a destination network that provided the call to the mobile device 104, a dynamic routing system 108, and/or the like. Although a number of different systems may perform some or all of the process 200, to simplify discussion, the process 200 will be described with respect to particular systems.

The process begins at block 202 when, for example, the dynamic routing system 108 receives a call initiated by a mobile device 102. In some embodiments, receiving a call may include receiving an indication that a user is attempting or likely to attempt to initiate a call. For example, when a user opens a dialer or other application on a phone or when a user enters or begins to enter a phone number to initiate a call, the process 200 may be initiated enabling the selection of a preferred network for completing the call prior to the call being initiated.

At block 204, the dynamic routing system 108 determines the one or more network protocols supported by the mobile device 102. The network protocols can include, for example, CDMA, GSM, or other supported cellular network protocols. Further, in some embodiments, the block 204 may include identifying one or more frequency bands and/or network providers supported by the mobile device 102. In some embodiments, the dynamic routing system 108 can route among a variety of communication networks that may vary based on the protocol implemented, the frequency bands supported, the communications standards supported (for example 3G, 4G, or 4G LTE) or other characteristics of the communication network that may, in some cases, impact which wireless devices can communicate with the communication network. For example, the dynamic routing system 108 may route a call between different GSM carriers, between different CDMA carriers, between a carrier implementing a 4G communication standard and a carrier implementing a 3G communications standard, and/or the like. To simplify discussion, and not to limit the present disclosure, a number of embodiments disclosed herein are described with respect to routing a call between a GSM and a CDMA network.

At decision block 206, the dynamic routing system 108 determines whether the user device supports a plurality of network protocols, such as a dual network protocol capability. This determination can be based, at least in part, on the determination that the user device supports both GSM and CDMA protocols, or other network protocols. In some embodiments, a network that supports a particular network protocol can be associated with one SIM card of a mobile device, and another network that supports a different network protocol can be associated with another SIM card of the mobile device.

If it is determined at the decision block 206 that the user device supports multiple network protocols, at block 210, the dynamic routing system 108 identifies a first network 106A that implements a first network protocol supported by the mobile device 102. For example, the first communications network 106A may implement a GSM protocol.

At block 212, the dynamic routing system 108 identifies a first signal strength for a communication channel using the first communication network 106A. Determining the signal strength may include sending a request to the mobile device 102 for a measurement of the first signal strength and/or may include receiving the measured first signal strength from the mobile device 102. The communication channel may be between the mobile device 102 and an initial base station or cell tower of the communication network 106A, which may be referred to as a first hop or first mile. Alternatively, or in addition, the first communication channel may include a greater portion of the communication channel between the mobile device 102 and the communication network 106A and/or the mobile device 104. In some cases, the signal strength is the signal strength between the mobile device 102 and the initial base station or cell tower.

At block 214, the dynamic routing system 108 identifies a second network 106B that implements a second network protocol supported by the mobile device 102. For example, the second communications network 106C may implement a CDMA protocol.

At block 216, the dynamic routing system 108 identifies a second signal strength for a communication channel using the second communication network 106B. In certain embodiments, the block 216 can include one or more of the embodiments described with respect to the block 212.

At block 218, based at least in part on the first and second signal strengths, the dynamic routing system 108 can select a communication network associated with the higher signal strength for the mobile device 102 to route the call. Routing the call via the network for which the mobile device 102 has the highest signal strength may include providing the mobile device 102 with the identity of the network associated with the highest signal strength enabling the mobile device 102 to initiate the call with the communications network that offers the best signal strength for the mobile device 102 at the particular location and time when the process 200 was initiated. Alternatively, or in addition, the dynamic routing system 108 can cause the call to be routed to the communication network with the highest signal strength on behalf of the mobile device 102. In certain embodiments, the process 200 may be used to identify a network to route a call based on alternative or additional criteria to signal strength. For example, drop call rate, time-of-day pricing, available network bandwidth, or other information may be used to identify a network to route the call. In certain embodiments, the operations associated with the blocks 214 and 216 may be repeated for each communication network or communication network protocol supported by the mobile device 102 or with which the mobile device 102 is capable of communicating. For example, the operations may be repeated for the communication network 106C.

If it is determined at decision block 206 that the mobile device 102 does not support multiple network protocols, at the block 208, the call is routed to the network supported by the mobile device 102.

Figure 3:
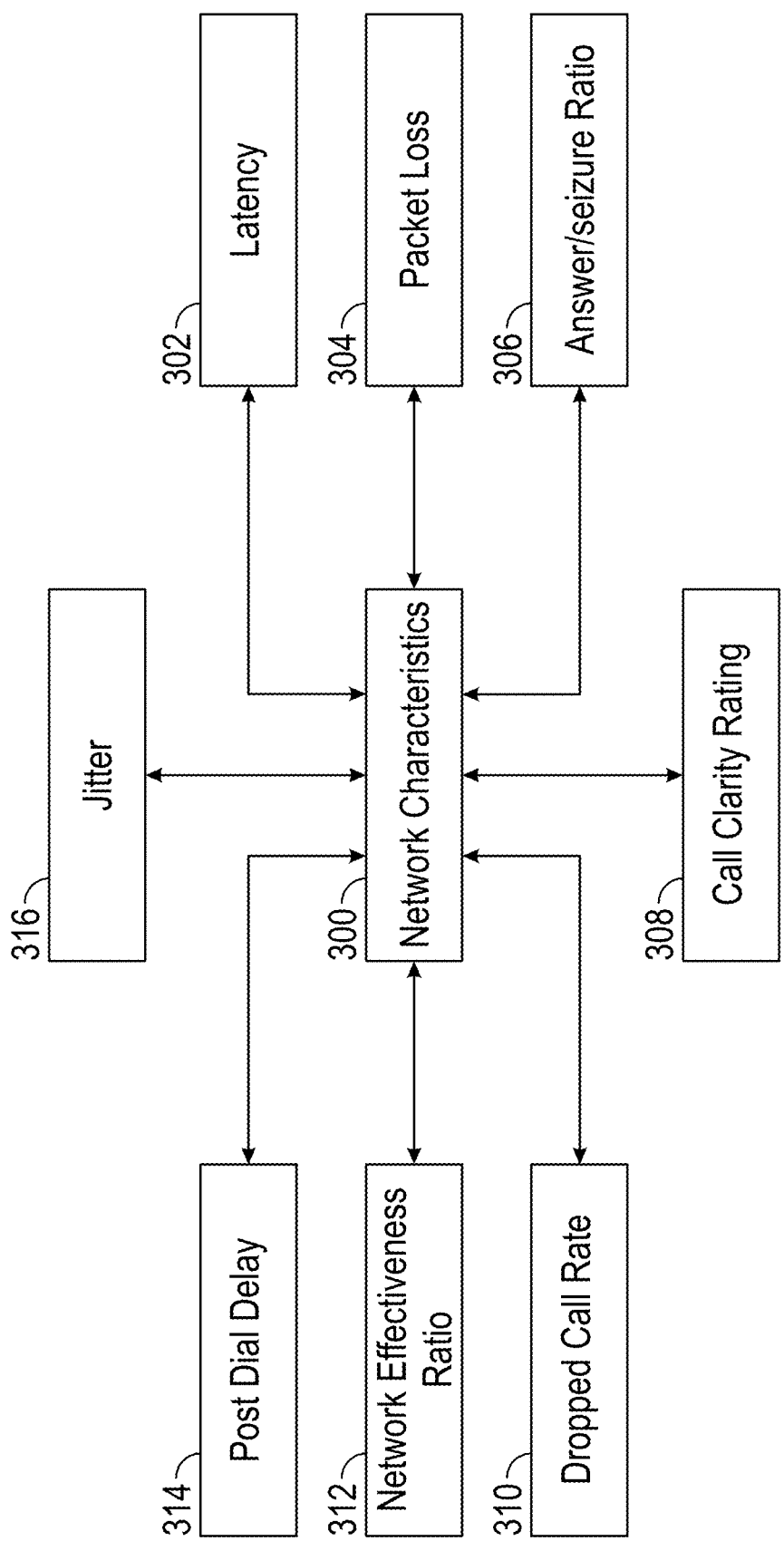
FIG. 3 illustrates a diagram illustrating various network characteristics that can be used to determine which communications network provider and/or network protocol to use to connect the call in accordance with the teachings of the present disclosure.

FIG. 3 illustrates a diagram identifying various network characteristics 300 that can be used to determine which network associated with a communications network provider and/or network protocol to use to connect the call in accordance with the teachings of the present disclosure. A non-limiting list of network characteristics 300 can include network latency 302, packet loss 304, an answer/seizure ratio 306, a call clarity rating 308, a dropped call rate 310, a network effectiveness ratio 312, a post dial delay 314, and/or the like. For example, the network latency 302 for a first network using the GSM protocol with a first communications network provider that supports the GSM protocol may be lower than that of a second network using the CDMA protocol with a second communications network provider that supports the CDMA protocol. In the example of block 216 of FIG. 2, the dynamic routing system 108 can route the call to a network using the GSM protocol because of the improved network latency 302 performance.

Call Pattern Identification and Profiling

Figure 4:
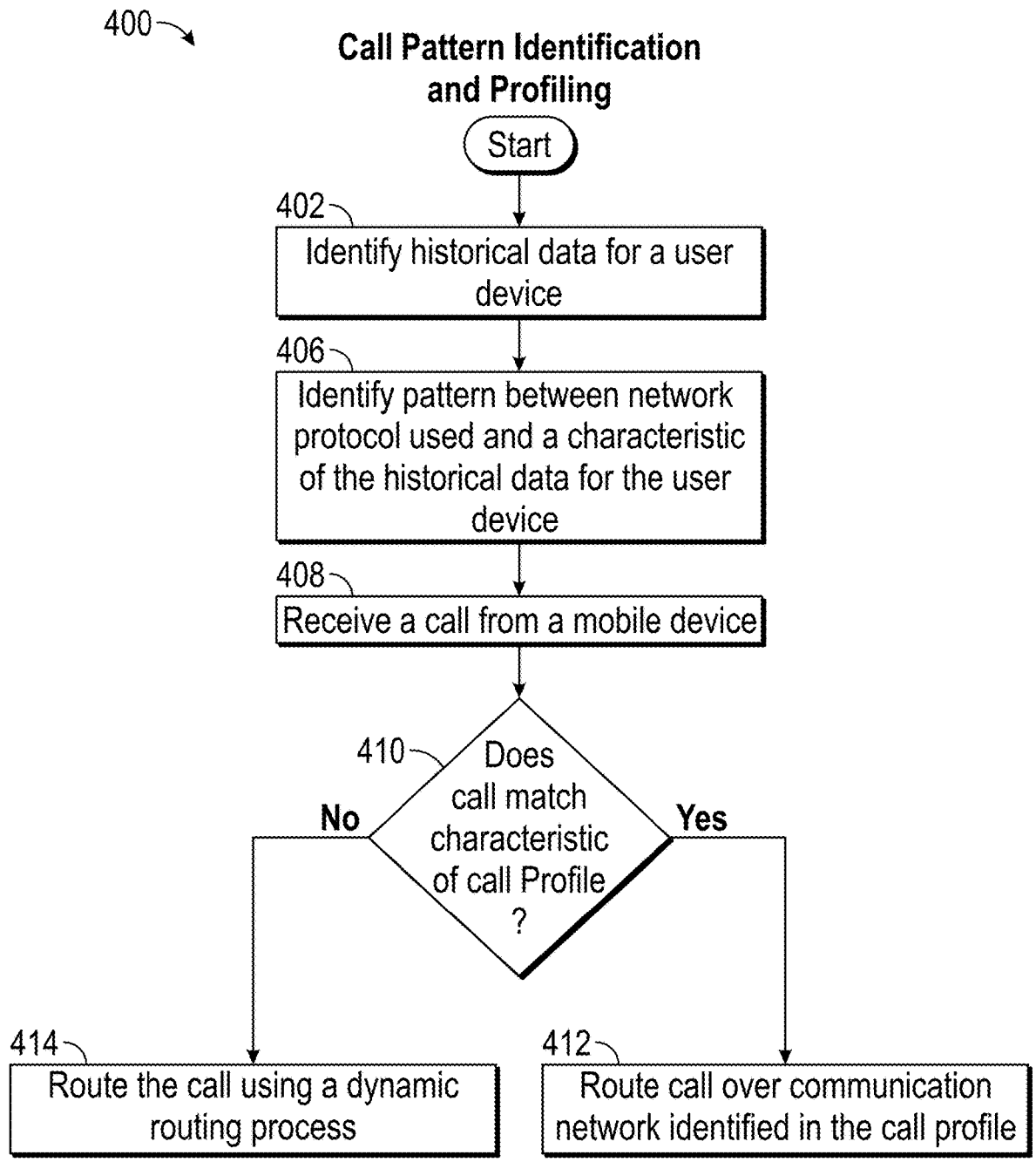
FIG. 4 illustrates a flow diagram for one embodiment of a process for determining a call pattern and creating a caller profile in accordance with the teachings of the present disclosure.

FIG. 4 illustrates a flow diagram for one embodiment of a process 400 for determining a call pattern and creating a caller profile in accordance with the teachings of the present disclosure. The process 400 can be performed by any system capable of determining a call pattern and/or creating and/or applying a caller profile. Although a number of different systems may perform some or all of the process 400, to simplify discussion, the process 400 will be described with respect to particular systems.

The process begins at block 402 when, for example, the dynamic routing system 108 identifies historical call data for a mobile device 102. In some embodiments, the historical call data is associated with a user or phone number associated with the mobile device 102. Thus, the historical call data may include historical data for multiple devices that are or have been associated with a user or phone number. The historical call data can include information relating to when calls are made, where the calls are made from (e.g., a home or business address, an urban or rural area, and the like), who is being called, and/or the like. For example, the historical call data may indicate that a particular user or mobile device 102 typically makes a call around 2:00 PM to a particular number each day, or on weekends.

At block 406, the dynamic routing system 108 identifies a pattern between the network and/or network protocol used, and a characteristic of the historical data for the user device 406. Using the identified patterns, a call profile can be established for the user or mobile device 102. For example, the dynamic routing system 108 can determine that a user initiates a call every evening from the user's home to a particular number (e.g., a number associated with the user's uncle). The dynamic routing system 108 can determine that the call occurs between a certain time period, such as between 8 PM to 10 PM. The dynamic routing system 108 can determine that the network that is frequently selected for this call or that provides the best signal strength is a particular network. The dynamic routing system 108 can establish criteria to automatically route the call to the particular network when a call is made that matches the profile created based on the historical data. In some embodiments, a machine learning process can be used to identify call profiles for a user or mobile device 102.

At block 408, the dynamic routing system 108 receives a call initiated by the mobile device 102, from a communications network. Receiving the call may include determining characteristics associated with the call, such as time of day, identity of the caller, location of the caller, and the like. For example, the dynamic routing system 108 can determine whether the request is to and/or from a certain caller, is being made in a certain time frame and/or geolocation, a call type and/or the like. In one embodiment, identifying the call type can include, for example: identifying if the call origin and/or the call destination is international; identifying if the call is interstate; identifying if the call is intrastate; identifying if the call is a fax call; identifying if the call is a modem call; identifying if the call is a toll-free call; and identifying if the call is a premium-rate call, to name a few.

At decision block 410, the dynamic routing system 108 determines whether the characteristics of the call matches characteristics of a call profile associated with the user or mobile device 102.

If the characteristics of the call satisfy a particular call profile, the dynamic routing system 108 routes the call using communication a network identified in the call profile at block 412. If the characteristics of the call do not satisfy a call profile, the dynamic routing system 108, at block 414, routes the call using a dynamic routing process, such as the process 200. In some embodiments, the call may be routed using a traditional routing process at block 414.

Geolocation Profiling

Figure 5:
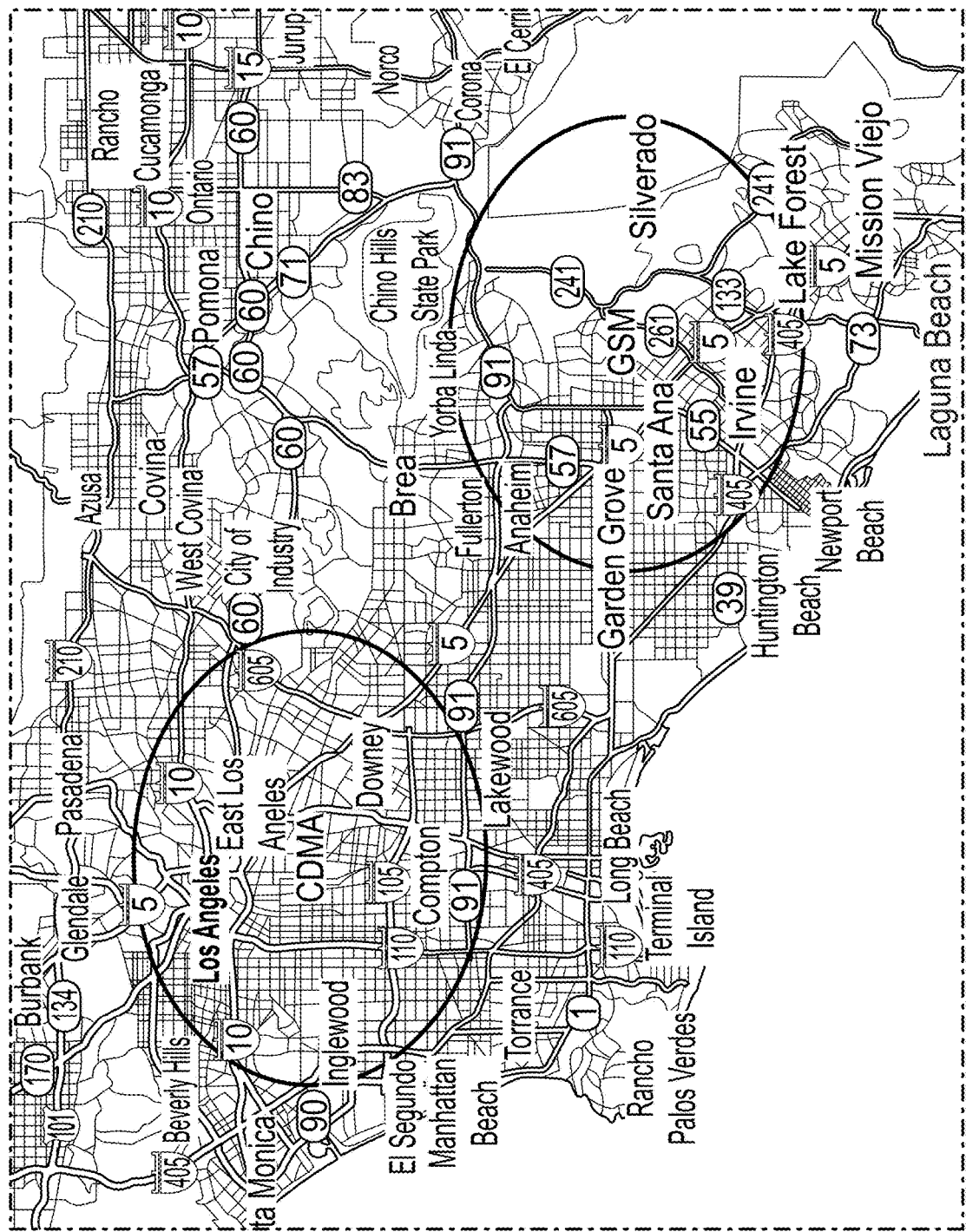
FIG. 5 illustrates a diagram for one embodiment of geolocation profiling for determining a network protocol for a call in accordance with the teachings of the present disclosure.

FIG. 5 illustrates a diagram for one embodiment of geolocation profiling for determining a network for a call in accordance with the teachings of the present disclosure. In some embodiments, it may be determined that for a particular mobile device 102 or user that a particular network is preferred in a particular geographic location. For example, as illustrated in FIG. 5, it may be determined that when a user is within Los Angeles, it is preferable to use a CDMA protocol for making calls because, for example, the CDMA protocol may provide increased signal strength or a lower dropped call rate. However, when a user or mobile device is in Orange County, it may be determined that it is preferable to make calls using a GSM protocol (e.g., over a GSM network) because, for example, the GSM protocol may provide increased signal strength or an improved call clarity compared to the CDMA network in the identified locations.

In some embodiments, the mobile device 102 and/or the dynamic routing system 108 can override the network selection indicated by the geolocation profile. For example, although it may generally be preferred to use a CDMA protocol in Los Angeles, the dynamic routing system 108 may determine based at least in part on network characteristics at a particular time that the GSM protocol is preferred. In some such cases, the default selection of a CDMA protocol may be overridden based on the determined or measured network characteristics at the particular time.

Routing Based on Source and Destination Network Characteristics

Figure 6:
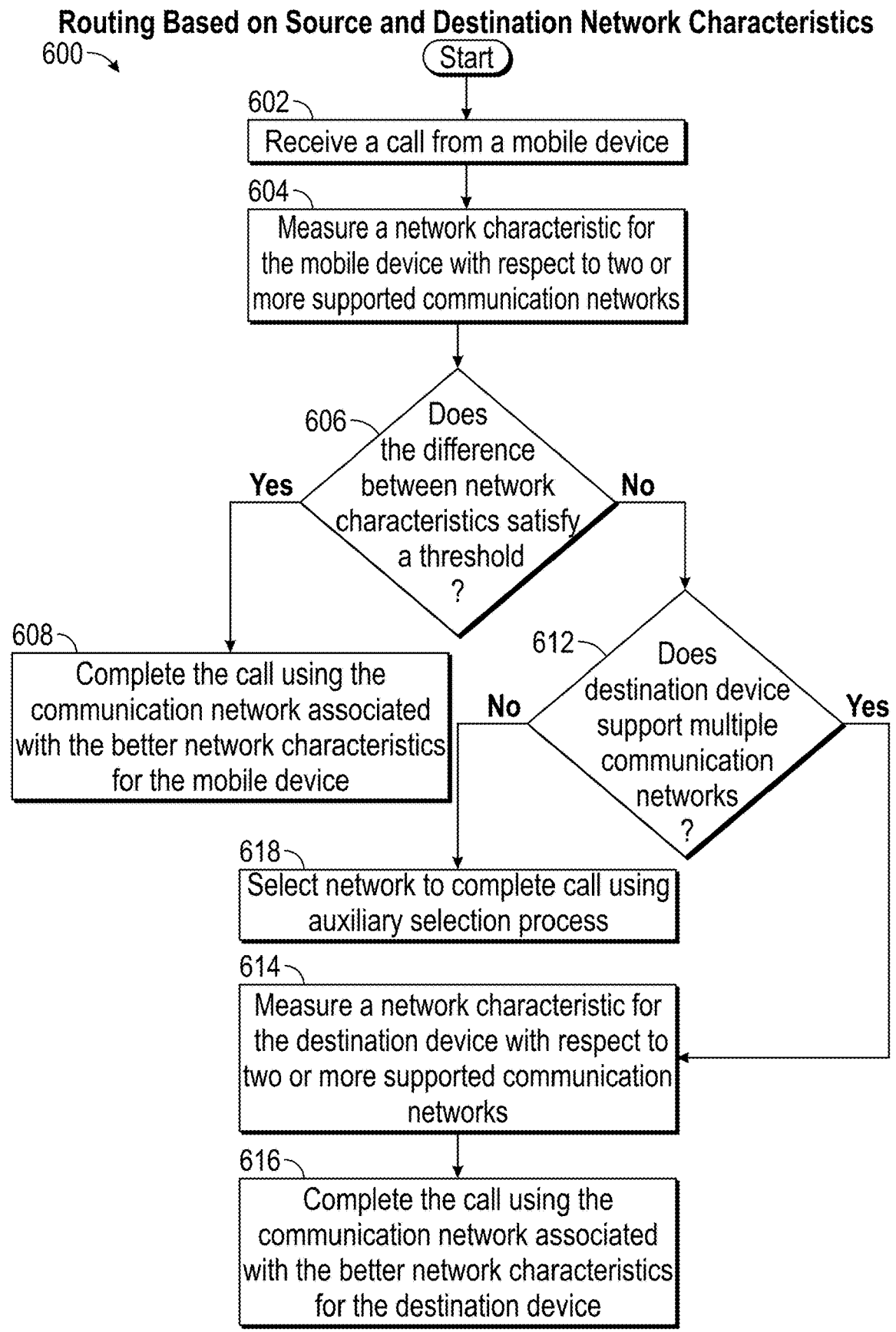
FIG. 6 illustrates a flow diagram for one embodiment of a dynamic call routing process for routing based on source and destination network characteristics in accordance with the teachings of the present disclosure.

FIG. 6 illustrates a flow diagram for one embodiment of a dynamic call routing process 600 for routing a call based on both source and destination network characteristics in accordance with the teachings of the present disclosure. The process 600 can be performed by any system capable of routing a call including a communications network 106 that initially received a call from the mobile device 102, a communications network 106 that completed the final call connection to the mobile device 104, a communications network somewhere in between, a dynamic routing system 108, and/or the like. Although a number of different systems may perform some or all of the process 600, to simplify discussion, the process 600 will be described with respect to particular systems . . .

The process begins at block 602 when, for example, the dynamic routing system 108 receives a call initiated by a mobile device 102, which may be referred to as a source or origin device. In certain embodiments, the block 602 may include one or more of the embodiments described with respect to the block 202.

At block 604, the dynamic routing system 108 identifies or measures a network characteristic for the source device for each of a set of two or more supported communication networks. As previously described the supported communication networks may include networks of different vendors and/or networks that implement or support different network protocols. For example, if the source device can interact or communicate with both a GSM network and a CDMA network, the dynamic routing system 108 can determine a first signal strength associated with the source device communicating with the GSM network and a second signal strength associated with the source device communicating with the CDMA network.

At decision block 606, the dynamic routing system 108 determines whether the difference between network characteristics of the two or more supported communications networks satisfies a threshold. For example, the dynamic routing system 108 can determine whether a difference between the first signal strength and the second signal strength in the previous example satisfies a threshold signal strength difference.

If it is determined that the difference between the network characteristics do not satisfy the threshold, then at block 612 the dynamic routing system 108 determines whether the mobile device 104, which may be referred to as the target or destination device, supports multiple communication networks. If the destination device supports multiple communication networks, at block 614, the dynamic routing system 108 identifies or measures a network characteristic for the destination device for each of a set of two or more supported communication networks. This network characteristic may be the same network characteristic determined at the block 604, or it may be a different network characteristic. For example, the dynamic routing system 108 may measure signal strength for the destination device with respect to each supported communication network as with the example described above with respect to the source device, or it may measure bandwidth. In some embodiments, both at the block 604 and the block 614, the network characteristics may include or may be a combination of multiple network characteristics. At block 616, the dynamic routing system 108 may complete the call using the communication network associated with the more desirable value. For example, the call may be completed with the communication network that has the highest signal strength or the lowest call drop rate for the destination device. If multiple communication networks are associated with the more desirable or better network characteristic value, an auxiliary selection process may be performed, such as a random communication network selection, a selection based on alternative network characteristics, a round-robin selection, a selection based on pricing, or a selection based on user preferences.

If it is determined at the decision block 612 that the destination device does not support multiple communication networks, a communication network is selected to complete the call using an auxiliary selection process. The auxiliary selection process may include selecting a communication network from the two or more communication networks supported by the source mobile device using a random communication network selection, a selection based on alternative network characteristics, a round-robin selection, a selection based on pricing, or a selection based on user preferences.

If it is determined at the decision block 606 that the difference between the network characteristics do satisfy a threshold, the dynamic routing system 108, at block 608, completes the call using the communication network associated with the better or more desired network characteristics for the mobile device 102. In certain embodiments, the block 608 may include one or more of the embodiments described with respect to the block 616. In certain embodiments, the dynamic routing system 108 may complete the call using the selected communication network by identifying the selected communication network to the mobile device 102. The mobile device 102 can then establish the call with the selected communication network. In some cases, establishing the call with the selected communication network may include initiating a new call with the selected communication network and transferring the audio from the call received at the block 602 to the new call. The establishing of a new call and/or the transfer of the existing call may occur without the knowledge of the user making or desiring to make the call using the mobile device 102.

In some embodiments, a determination of a communication network to complete the call may be based at least in part on network characteristics for communication networks available to the source mobile device 102 and the destination mobile device 104. In other embodiments, for a particular call, a communication network may be selected for the outgoing portion of the call placed by the mobile device 102 and a communication network may be selected for the incoming portion of the call to the mobile device 104. Thus, a communication network 106A may be selected for the mobile device 102 to make a call, while a communication network 106C may be selected for the mobile device 104 to receive the call.

Rerouting During a Call

Figure 7:
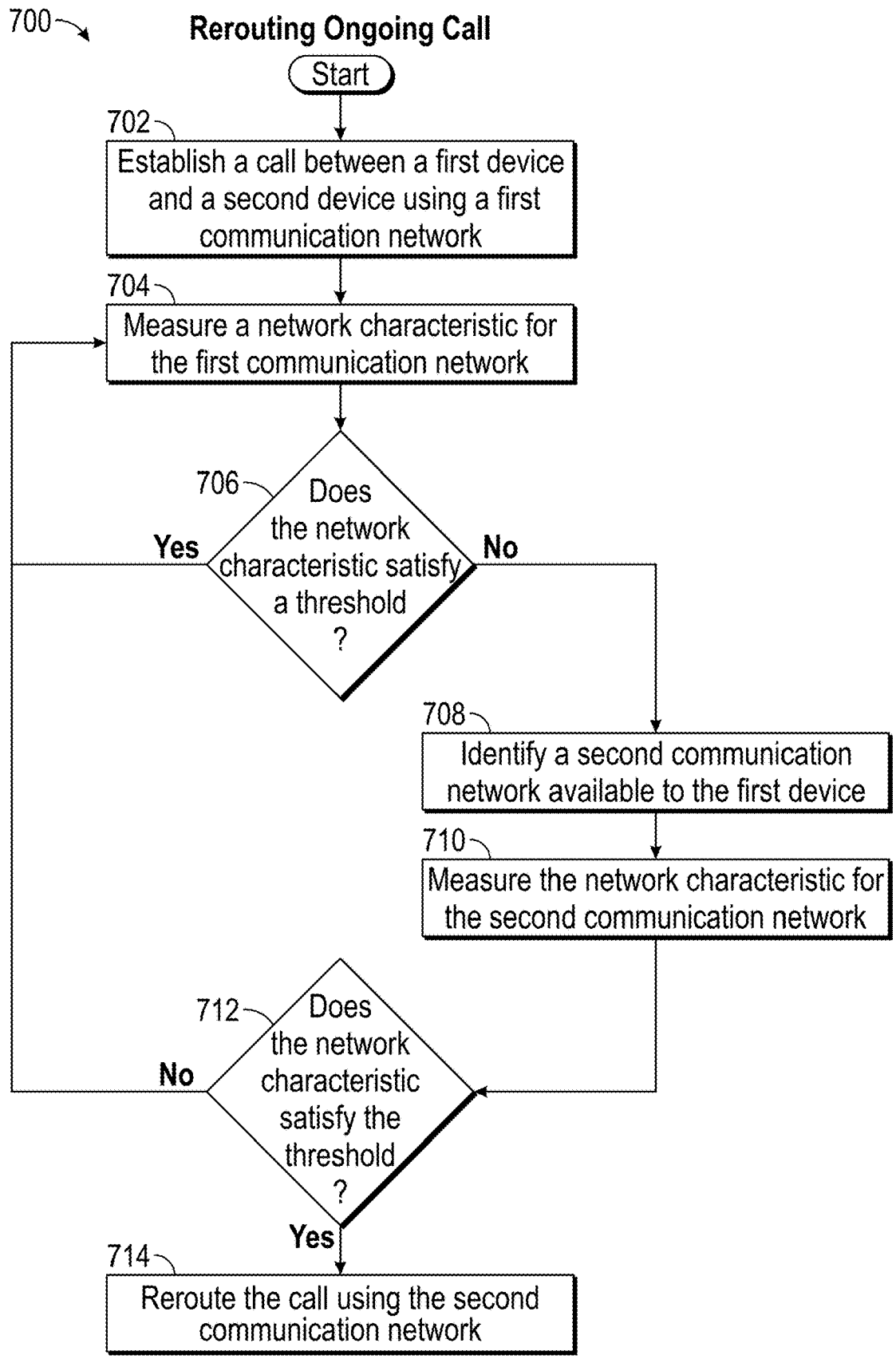
FIG. 7 illustrates a flow diagram for one embodiment of a dynamic call routing process for rerouting during a call in accordance with the teachings of the present disclosure.

FIG. 7 illustrates a flow diagram for one embodiment of a dynamic call routing process 700 for rerouting an ongoing call in accordance with the teachings of the present disclosure. The process 700 can be performed by any system capable of routing a call including a communications network 106 that initially received a call from the mobile device 102, a communications network 106 that completed the final call connection to the mobile device 104, a communications network somewhere in between, a dynamic routing system 108, and/or the like. Although a number of different systems may perform some or all of the process 700, to simplify discussion, the process 700 will be described with respect to particular systems.

The process begins at block 702 when, for example, the dynamic routing system 108 establishes a call between a source device 102 and a target device 104 using a first communication network 106. Establishing the call may include selecting the first communication network 106 using, for example, the process 200, the process 600, or any other process for selecting a communication network from among a plurality of communication networks. Further, establishing the call may include connecting the device 102 to the device 104 using the selected network. Alternatively, establishing the call may include providing the device 102 with an identity of the communication network enabling the device 102 to establish the call using the selected communication network.

At block 704, the dynamic routing system 108 measures, or otherwise determines, a network characteristic for the first communication network, which may use a first network protocol. For example, the dynamic routing system 108 can determine a signal strength, a bandwidth, or a dropped call rate for the first communication network. For example, the network characteristic can include one or more network characteristics described in FIG. 3 above.

At decision block 706, the dynamic routing system 108 determines if the measured network characteristic satisfies a threshold value. If the measured network characteristic satisfies the threshold, the process 700 returns to the block 704 where the dynamic routing system 108 may continuously, intermittently, or periodically measure the network characteristic. In some embodiments, a threshold can be determined based on an identified pattern. For example, a threshold can be determined based on a pattern identified in the historical data for a user device of FIG. 4. The pattern can be identified between a network protocol and a characteristic of the historical data for the user device, and the threshold can be established based on this pattern. For example, the historical data for a user device can indicate a high packet loss for a mountainous region for the GSM protocol. If the user is traveling through the mountainous region at a later time using the CDMA protocol, the system may set the packet loss threshold to be higher for switching to the GSM protocol. In another example, the historical data for the user can indicate that the CDMA protocol has historically performed better (e.g., higher call clarity or less dropped calls) than the GSM protocol for the mountainous region. In some such cases, the system may automatically default calls to a network using the CDMA protocol. The system may switch to the GSM protocol based on an average difference between the historical performance of a network implementing a CDMA protocol and a network implementing a GSM protocol.

In some embodiments, the threshold can be a dynamic threshold. For example, a wireless device can be connected to a call using a first protocol. The system can identify performance of network characteristics for the first protocol. The system can also identify performance of network characteristics for the second protocol. For example, as the caller is traveling from one destination to another while on the call, the performance of network characteristics for the first protocol may diminish, while the performance of network characteristics for the second protocol may improve. The threshold to switch the call from the first protocol to the second protocol can be dynamically adjusted based on the change of the performance of network characteristics for the first and second protocols. In one embodiment, the dynamic threshold can be adjusted based on an average of the performance of network characteristics for the first and second protocols. In another embodiment, the dynamic threshold can be based on the performance of the network characteristic for the first protocol diminishing below the performance of the network characteristic for the second protocol. For example, the dynamic threshold can be based on the performance of the network characteristic for the first protocol diminishing below the performance of the network characteristic for the second protocol for a particular time period.

If it is determined that the measured network characteristic does not satisfy the threshold, the dynamic routing system 108, at block 708, identifies a second available communication network, which may use a second network protocol that differs from the first network protocol. Alternatively, both networks may use the same network protocol, but may be maintained by different vendors and/or may use different frequency bands.

At the block 710, the dynamic routing system 108 measures the network characteristic for the second communication network. The block 710 may include one or more of the embodiments described with respect to the block 704.

At decision block 712, the dynamic routing system 108 determines whether the network characteristic measured, or otherwise obtained, at the block 710 satisfies the threshold. If it is determined that the measured network characteristic for the second communication network does not satisfy the threshold, the process may return to the block 704. In some embodiments, the time between successive measurements of the network characteristic at the block 704 may differ based on whether the process 700 returned to the block 704 from the decision block 706 or the decision block 712. Further, in some embodiments, the time between successive measurements of the network characteristic at the block 704 may differ based on whether the user associated with the device 102 has moved a threshold distance. For example, the block 704 may be repeated more frequently for a user who is moving at more than a threshold rate, such as a user who may be in a moving vehicle or is walking around a neighborhood or town. The process 700 may be performed more frequently when the user is moving than when the user is stationary, or relatively stationary, because the user may pass through more cell regions associated with different base stations. Alternatively, or in addition, the process may be performed more frequently when a user is moving (e.g., driving or walking) because the user may pass by more obstacles that can affect wireless coverage compared to when the user is stationary (e.g., sitting at home or at work). In some embodiments, the process 700 may end instead of returning to the block 704.

If at decision block 712 it is determined that the network characteristic measured at the block 710 for the second communication network satisfies the threshold, the dynamic routing system 108, at the block 714, reroutes the call using the second communication network. Rerouting the call may include establishing a second call with the second communication network and transferring the audio to the second call after establishing the second call. The initial call may then be ended. In some embodiments, the dynamic routing system 108 reroutes the call by instructing the mobile device 102 to establish the new call and to switch the audio to the new call. In some embodiments, the call is rerouted without knowledge of the users involved in the call.

In some embodiments, the threshold used at the decision block 706 and the decision block 712 may differ. For example, the threshold to determine whether a network may exist that may provide better service or satisfy particular desired criteria (e.g., the threshold at the block 706) may be lower than the threshold used to determine whether to select a new communication network to process the call (e.g., the threshold at the block 712). Advantageously, by using different thresholds, it is possible to account for communication resource costs involved in switching or rerouting an existing call. Moreover, in certain embodiments, by using a higher threshold to determine whether to switch communication networks rather than a threshold used to determine whether additional networks exist, the continuous and repeated rerouting of calls between two networks can be reduced.

In certain embodiments, instead of, or in addition to, determining that the network characteristic of the second communication network satisfies a threshold, the decision block 712 may include determining whether the network characteristic for the second communication network is more than a threshold degree higher or better than the network characteristic for the first communication network. Advantageously, in certain embodiments, by ensuring the second communication network is more than a threshold degree better than the first communication network before rerouting the call, the occurrence of continuous and repeated rerouting of calls between two networks can be reduced.

Dual-SIM Wireless Devices

Cellular communication networks often use subscriber identity modules (SIM) to identify a user of a wireless device. The SIM card is often implemented as a type of smartcard or integrated circuit that is inserted into a wireless device and communicates with a processor of the wireless device and/or a communication network. The SIM card will include information that uniquely identifies the user and/or wireless device. For example, the SIM card may securely store an international mobile subscriber identity (IMSI) number and its related key. This information stored on the SIM card may be used to identify and authenticate users or subscribers of a mobile or wireless device. The SIM card may additionally include a unique serial number, such as an integrated circuit card identifier (ICCID), security authentication and ciphering information, temporary information related to a local network (e.g., a cellular or other wireless network), a list of services accessible by a user, and one or more passwords (e.g., a personal identification number (PIN), and a personal unblocking code (PUC) for PIN unlocking). The SIM card is often required to enable a wireless device to connect to and/or communicate with a particular cellular network associated with the SIM card.

Further, a SIM card of one cellular network is often unusable for a wireless device to connect to and/or communicate with another cellular network. For example, a wireless device with a SIM card that enables communication with a T-Mobile® network typically cannot communicate with a Verizon® or ATT® network. A user desiring to communicate on the Verizon® or ATT® network must usually change the SIM card with one that is associated with the Verizon® or ATT® network.

Most wireless devices support a single SIM card and thus, most wireless devices can only communicate with a single cellular communication network at any given time. Some wireless devices may support two SIM cards enabling the wireless device to communicate with two cellular networks. However, typically only one SIM card may be active at a time. Thus, the wireless device can only communicate with a single cellular network associated with the active SIM card. Moreover, to switch SIM cards and communicate with another cellular network using the second SIM card, the wireless device typically must be reset or restarted, or the network subsystem at a minimum must be rebooted. When the wireless device is restarted or rebooted, the second SIM card can be selected as the active SIM card.

Often, if inconvenient at all, the restarting of the wireless device or the network subsystem of the wireless device is only a minor inconvenience because, for example, users often only switch SIM cards and/or cellular networks when travelling to a different country. In such cases, the phone is usually turned off or is in "airplane" mode during transit. Thus, the switching of SIM cards may be considered part of the turning on of the wireless device at the new location.

However, beyond travelling between countries or distant geographic locations associated with different cellular networks, there may be additional times when it can be beneficial to change cellular networks. For example, as a user travels in a more limited area or within a particular country, the coverage area or strength of a particular cellular network may vary. Usually a user's quality of service when using the wireless device corresponds to limitations of the particular cellular network subscribed to by the user. However, in some cases, it is desirable to maintain an improved quality of service by switching between cellular networks to maintain service using the cellular network that provides the best connection or highest signal strength in any particular area. Further, it may be desirable to have connections to multiple cellular networks simultaneously to improve multitasking with the wireless device. For example, a user may desire to download or stream content (e.g., music, movies, or games) from one or more content providers simultaneously, and/or while on a voice call with another user. In some such cases, each service or action may affect the quality of service or the other service or action when performed during connection to a single cellular network. However, by connecting to multiple cellular networks, it is possible to perform multiple tasks with minimal impact on each task. Moreover, it is possible to assign higher priority tasks, or tasks that require more bandwidth (e.g., high-definition content download) or a better connection to one cellular network while assigning lower priority tasks or tasks that require less bandwidth (e.g., a voice call) to another cellular network that may have lower signal strength.

Embodiments disclosed herein present a system and methods that enable a wireless device to communicate over multiple cellular networks without the aforementioned problems. For example, embodiments disclosed herein present a wireless device that is capable of communicating with multiple cellular networks at the same time, or substantially the same time, without requiring the wireless device to be reset or to reboot some or all of the wireless device. Further, embodiments disclosed herein present a wireless device that can switch the cellular network that is performing a task (e.g., downloading media, performing a voice call) prior to performing the task and/or during the task without downtime or loss of access to the cellular network during the transition between cellular networks.

Figure 8:
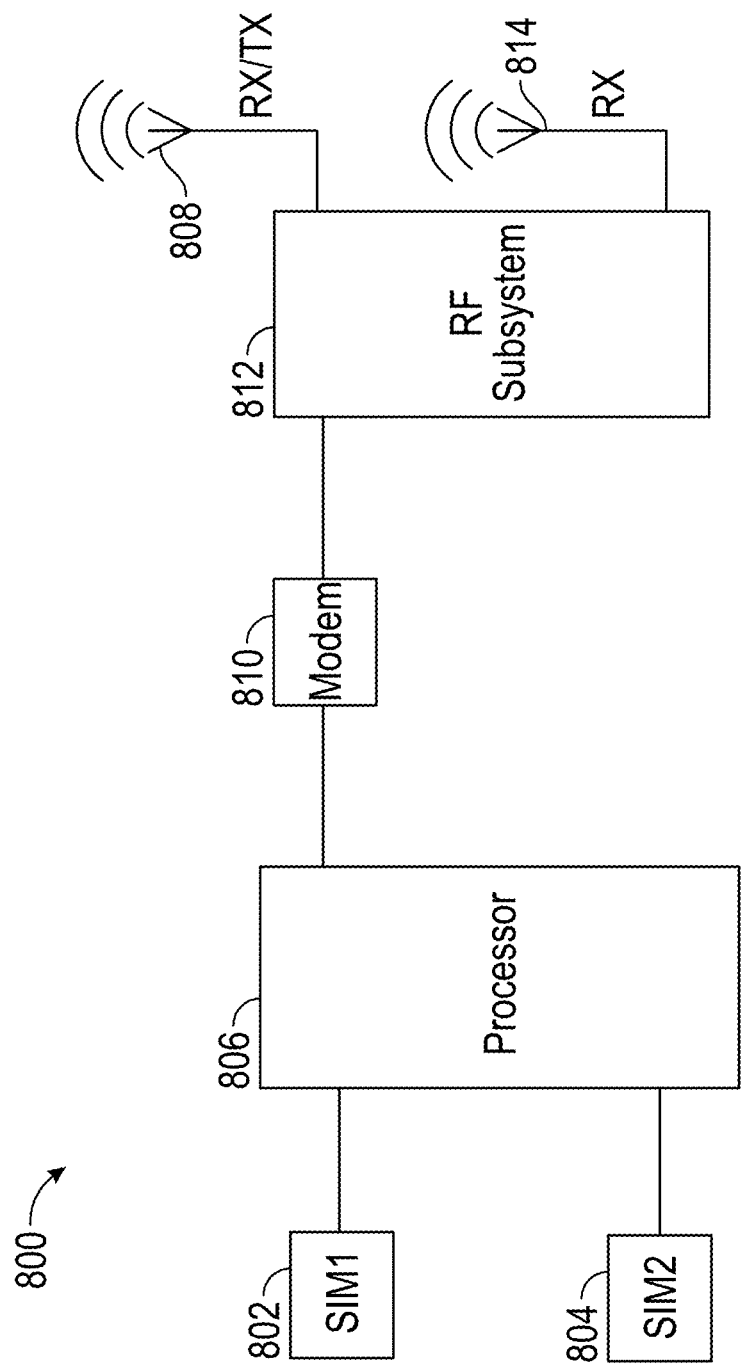
FIG. 8 illustrates a block diagram of a comparative example of a dual-SIM wireless device.

FIG. 8 illustrates a comparative example of a portion of a dual-SIM wireless device 800. As illustrated, the wireless device 800 may include two SIM cards 802, 804 that may communicate with a processor 806. The processor 806 may control communication with a pair of cellular networks associated with the SIM cards 802, 804, respectively. Further, the wireless device 800 includes a single or primary antenna 808 for transmitting and receiving voice or data packets over a cellular network. The wireless device 800 further includes a modem 810 and RF subsystem 812, which way include a front-end module, filter, or other radio frequency hardware for separating or combining signals that are received or are to be transmitted over the cellular network. The modem 810 may convert data for transmission via the primary antenna 808. The modem 810 can convert digital data packets to modulated electrical signals for transmission via the primary antenna 808. The RF subsystem 812 may include radio frequency diplexers, duplexers, and amplifiers for facilitating transmission and reception of wireless signals. For example, the RF subsystem 812 may include a front-end module configured to filter and amplify (e.g., using a low noise amplifier) a received signal. Further, the front-end module may further include one or more power amplifiers for amplifying a signal for transmission.

The wireless device may include a diversity antenna 814 that may be used to help determine signal strength. The diversity antenna 814 may obtain an independent sample from signals received by the wireless device. These independent samples may be used to measure the signal strength of signals received from the cellular network associated with the SIM card 802 or the SIM card 804. Typically, the diversity antenna is for receive only and does not transmit signals, including voice or data packets. As such, the wireless device does not include a modem in connection with the diversity antenna 814.

To switch between networks associated with the SIM 802 or SIM 804, the wireless device 800 may be rebooted or turned off and then back on. Alternatively, the network subsystem may be reset. In either case, communication with a cellular network is generally not maintained while the active SIM is switched between SIM 802 and SIM 804.

Figure 9:
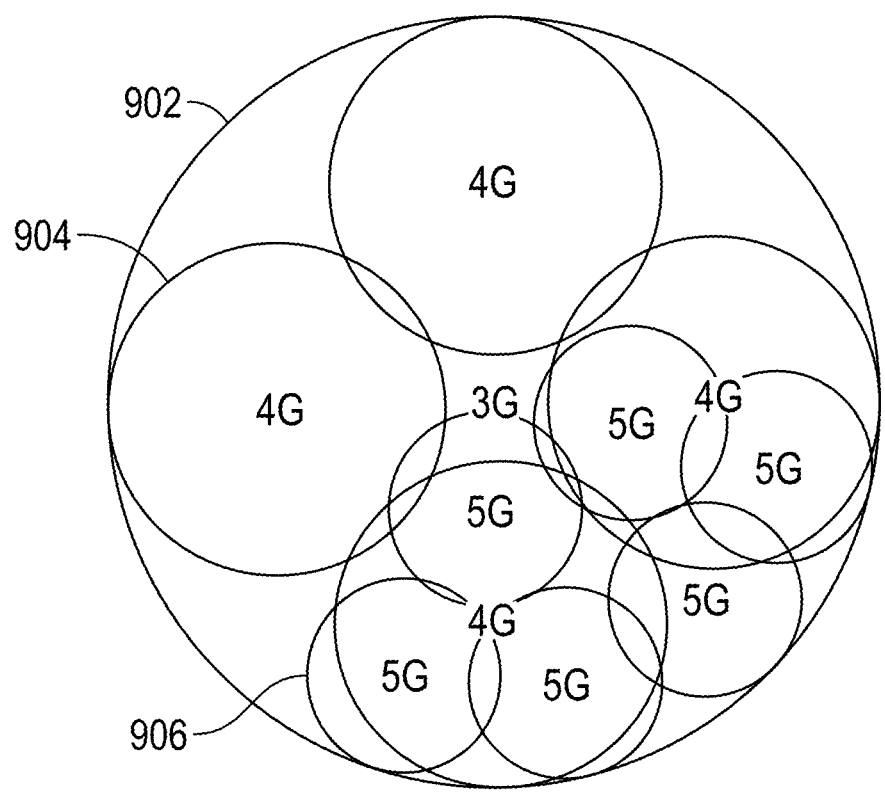
FIG. 9 illustrates an example of cellular coverage across different communication technologies.

FIG. 9 illustrates an example of cellular coverage across different communication technologies. Each of the circles represents the coverage of a single base station implementing a particular communication technology. For ease of illustration, some circles associated with 4G and/or 5G communication are omitted. However, it should be understood that more circles representing more base stations may exist to cover more of the geographic area represented by the circle 902.

The circle 902 may represent a geographic area with 3G cellular coverage provided by a single 3G base station. A base station implementing 3G communication technology may have wider geographic coverage compared to base stations that implement 4G or 5G communication technology as represented by the circles 904 and 906. Thus, more 4G or 5G base stations may be required to cover the same geographic area as a 3G base station. Further, more base stations implementing 5G technology may be required than base stations implementing 4G technology to cover the same geographic area. Thus, although newer cellular communication technologies may provide benefits, such as improved bandwidth or improved download/upload speeds, the coverage may be worse in particular geographic areas. It is therefore desirable to have wireless devices that can take advantage of different competitors' cellular networks to improve the chance of optimal coverage in any particular area. For example, it is advantageous to have a wireless device that can communicate over 2, 3, or more cellular networks without input from a user and/or without restarting or rebooting the wireless device or the network subsystem, which may include one or more pieces of hardware that facilitate communication over a network, of the wireless device.

Example Dual-SIM and Dual-Data Active Device

Figure 10:
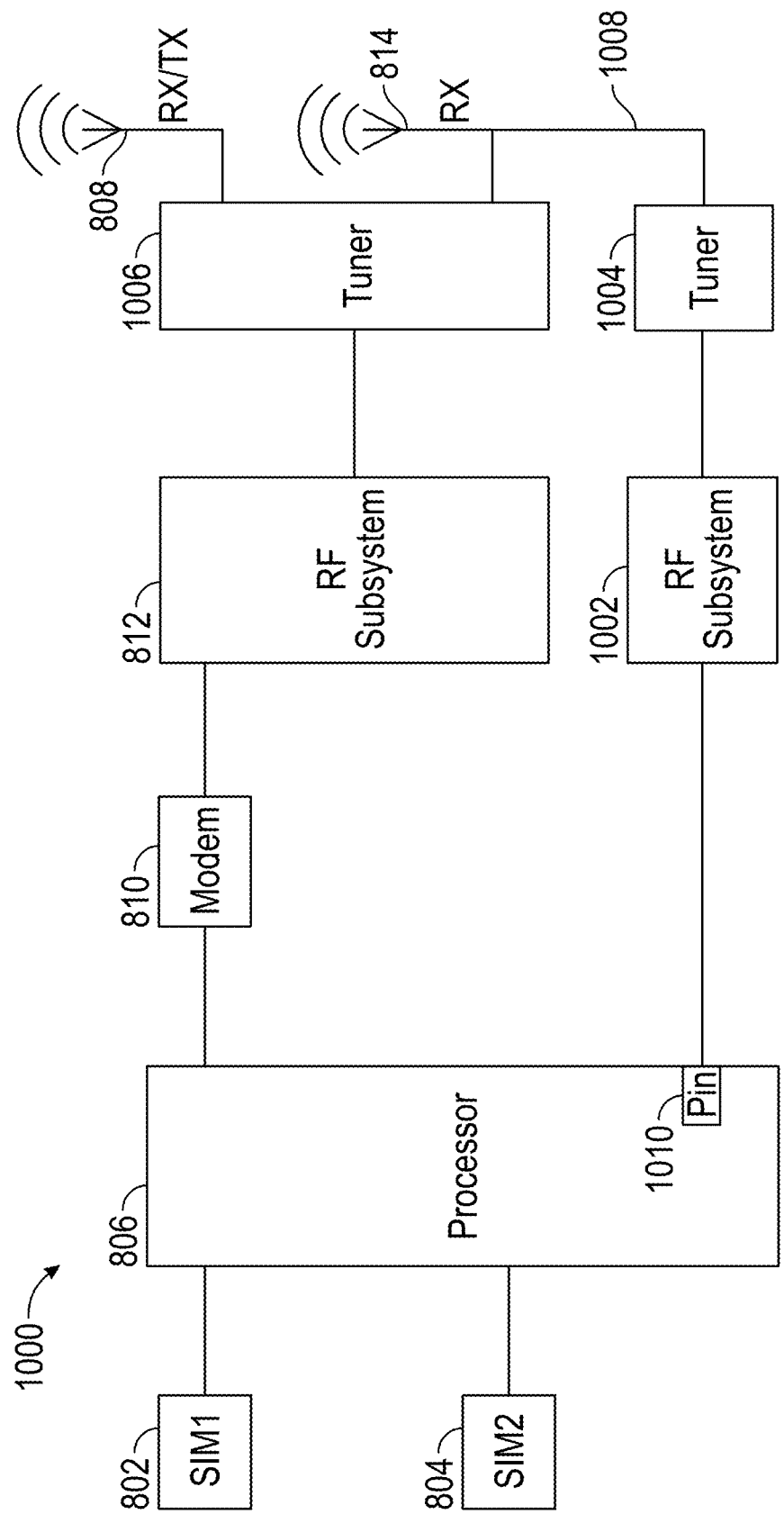
FIG. 10 illustrates a block diagram of an example of a dual-SIM dual-data active wireless device in accordance with certain embodiments of the present disclosure.

FIG. 10 illustrates an example of a portion of a dual-SIM dual-data active wireless device 1000 in accordance with certain embodiments. As discussed above, with respect to the wireless device 800, a wireless device may have multiple SIM cards. Such a device may be referred to as a dual-SIM device. As previously discussed, the dual-SIM device can only communicate with a single communication or cellular network at a time using a single SIM card. To communicate using the second SIM card, the wireless device must be reset to switch the active SIM card to the second SIM card.

A dual-SIM dual-data active wireless device enables a wireless device to communicate with multiple cellular networks using multiple SIM cards without needing to reset the wireless device, or network subsystem, which can cause temporary loss of a connection for a period of time, e.g., 20, 30, or 45 seconds. Although the temporary loss of connection may be acceptable when the wireless device is not in use, it can be problematic during a call or when the wireless device is accessing content on a network. A dual-SIM dual-data active wireless device may include a wireless device that can transmit and/or receive data packets on two cellular networks associated with two different SIM cards at the same time, or substantially the same time (e.g., within 1, 2, or 5 microseconds apart, or close enough in time that a user does not experience a loss or reduction in service).

In some embodiments, data packets transmitted over one cellular network may be associated with a first task, and data packets transmitted over another cellular network may be associated with the first task or a second task. For example, the first task may be accessing media at a first network site or from a first media service and the second task may be a voice call with another user or accessing media from another network site or media service. The data packets may be received or transmitted over the two cellular networks simultaneously or sufficiently close enough in time such that a user does not notice an interruption in services or an interruption in the performance of either the first task or the second task. In other words, in certain embodiments, the user may download content from a media site over the first communication network while talking to another user over the second communication network without any interruption in either task.

The wireless device 1000 of FIG. 10 includes a number of similar elements as the wireless device 800 as indicated by the re-use of certain reference numbers. The wireless device 1000 may be, or may mimic, a dual-SIM dual-data active wireless device in that the wireless device 1000 can receive communications from multiple cellular networks simultaneously, and can transmit across multiple cellular networks. However, at a particular point in time, the wireless device 1000 transmits across one cellular network. The wireless device may switch the active SIM associated with the desired cellular network dynamically and without restarting the wireless device enabling the wireless device 1000 to function similarly to a dual-SIM dual data active wireless device.

The wireless device 1000 includes a second RF subsystem 1002. The second RF subsystem 1002 may be configured similarly to, and may perform similar actions as, the RF subsystem 812. However, while the RF subsystem 812 may process signals received on the primary antenna 808, the RF subsystem may process signals received by the diversity antenna 814. Thus, in some cases, the RF subsystem 812 may process signals from a first cellular network associated with the SIM 802 that are received by the primary antenna 808, and the RF subsystem 1002 may process signals from a second cellular network associated with the SIM 804 received by the diversity antenna 814. In other cases, the RF subsystem 812 may process signals from the second cellular network associated with the SIM 804 that are received by the primary antenna 808, and the RF subsystem 1002 may process signals from the first second cellular network associated with the SIM 802 received by the diversity antenna 814.

As illustrated in FIG. 10, the signal path that includes the RF subsystem 812 includes the modem 810. However, the signal path that includes the RF subsystem 1002 omits the modem. Accordingly, in certain embodiments of the wireless device 1000, the signal path that includes the RF subsystem 812 may both receive and transmit voice and/or data packets using the primary antenna 808. However, the signal path that includes the RF subsystem 1002 may receive signals, but may not transmit signals via the diversity antenna 814. Further, the signals received at the diversity antenna 814 from the second cellular network may be all data packets, which may include voice data packets (e.g., VoLTE), but may omit voice packets. Accordingly, in certain embodiments, the RF subsystem 1002 may be a slimmed down version of the RF subsystem 812. For example, while the RF subsystem 812 may include a power amplifier module with one or more power amplifiers for amplifying a signal prior to transmission, the RF subsystem 1002 may omit the power amplifier module. The slimmed down RF subsystem 1002 may thus be smaller in physical area and may use less power than the RF subsystem 812.

In certain embodiments, the wireless device may include a tuner 1004 and a tuner 1006. The tuners 1004, 1006 may include any type of filter that can separate the signals received on the antennas 808, 814. For example, the tuner 1004 may include a band-pass filter to pass signals associated with a first cellular network associated with SIM 802 and one or more band-stop filters to remove signals (e.g., noise, undesired harmonics, frequency bands associated with other wireless or cellular networks, and the like) not associated with communication with the first cellular network. Similarly, the tuner 1006 may include a band-pass filter to pass signals associated with a second cellular network associated with SIM 804 and one or more band-stop filters to remove signals not associated with communication with the second cellular network. Further, the tuners 1004, 1006 may convert the received RF signals from the cellular networks into a fixed frequency that facilitates further processing by the RF subsystems 812, 1002 and/or the hardware processor 806.

The tuner 1006 may further be configured to determine whether a received signal is from a cellular network implementing CDMA, TDMA, GSM, or some other type of communication protocol or standard. In some cases, the determination may be made based on a header that identifies the transmitter of the signal or data packer. In other cases, the determination may be made based on the signal characteristics. Based on the determination of the type of communication protocol, the tuner 1006 may cause a modification in the configuration of the RF subsystem 812. Alternatively, or in addition, the RF subsystems 812, 1002 may determine the type of cellular network or the communication protocol implemented by the cellular network. In yet other embodiments, the processor 806 may determine the type of cellular network or the communication protocol implemented by the cellular network, and may configure the RF subsystems 812, 1002 accordingly.

In certain embodiments, the processor 806 may determine that the second cellular network associated with the SIM 804 is preferable for transmission. For example, the processor 806 may determine that the current signal strength of the second cellular network exceeds, or exceeds by a particular threshold, the current signal strength of the first cellular network. Additionally, or alternatively, the processor 806 may determine that transmission should occur over both the first cellular network and the second cellular network using both SIM 802 and SIM 804, respectively. For example, the processor 806 may determine that the wireless device 1000 is attempting to transmit media (e.g., pictures) to a cloud network service (e.g., Dropbox®), and is attempting to establish and maintain a voice call, either using voice-packets or data packets (e.g., Voice over LTE (VoLTE)), or to transmit other data packets using another service (e.g., send email using an email provider). In some such cases, the wireless device 1000 may maintain also receive signals associated with the cellular network that is currently transmitting. Thus, in some such cases, either antenna 808, 814, and corresponding signal path, may receive signals from either cellular network associated with the SIMs 802, 804. As such, in some embodiments, the tuner 1004 may further include a band-pass filter to pass signals associated with the second cellular network associated with SIM 804 and one or more band-stop filters to remove signals not associated with communication with the second cellular network. Similarly, the tuner 1006 may further include a band-pass filter to pass signals associated with the first cellular network associated with SIM 802 and one or more band-stop filters to remove signals not associated with communication with the first cellular network.

It should be understood that the tuners 1004, 1006 may include other types of filters and may include other circuitry for performing other functions related with the receipt of one or more signals associated with one or more cellular and/or wireless networks. Further, the tuner 1006 may additionally include circuitry for performing functions related to the transmission of signals associated with one or more cellular and/or wireless networks. In certain embodiments, the tuners 1004, 1006 may be optional or omitted. For example, the functionality of the tuners 1004, 1006 may be included in the RF subsystems 812, 1002, respectively. Further, in certain embodiments, the wireless device 1000 may further include one or more additional filters, diplexers, duplexers, or other circuitry for splitting and/or combining signals for communication with the cellular networks.

To enable the additional signal path that includes the RF subsystem to receive signals from one or more of the cellular networks, the diversity antenna 814 may include an additional connection 1008. The connection 1008 may provide the signal received at the diversity antenna 814 to the tuner 1004. Accordingly, the received signal received by the diversity antenna 814 may be provided to both the tuner 1006 and the tuner 1004. The signal provided by the antenna 814 to the signal path that includes the tuner 1006 may be used to measure a signal strength of a cellular network in communication with the wireless device 1000. The signal provided by the antenna 814 to the signal path that includes the tuner 1004 may be processed to obtain data received over the cellular network in communication with the wireless device 1000.

The RF subsystem 1002 may be in communication with a port of the processor, such as an auxiliary port. The port may be a pin 1010 that is included on the processor 806 that enables an auxiliary device to communicate with the processor 806. Advantageously, in certain embodiments, by connecting the second signal path to another port of the processor 806 (e.g., the pin 1010) it is possible to switch the active SIM 802 or 804 without resetting, rebooting, or otherwise losing communication to one of the cellular networks.

In certain embodiments, the auxiliary device is the second RF communication path that permits signals received from a cellular network at the diversity antenna 814 to be provided to the processor 806. The processor 806 can receive data from a second cellular network associated with the second SIM 804 over the diversity antenna 814 via the second RF subsystem 1002 connected to the auxiliary port. In some embodiments, the pin 1010 is not an auxiliary port but is associated with a particular feature of the processor 806. In some such embodiments, the pin 1010 can be repurposed to receive communication signals from a cellular network over the antenna 814 in place of the feature previously associated with the pin 1010. Accordingly, in certain embodiments, existing processors 806 can be retrofitted to support multiple cellular networks communicating with the wireless device 1000 in concert.

Further, the processor 806 can switch the SIM 802, 804 card that is using the first or primary RF subsystem 812 enabling the wireless device 1000 to transmit over either cellular network using the primary, or non-diversity, antenna. The processor 806 may determine the SIM 802, 804 card, or cellular network, to connect to or communicate with using the primary antenna 808 based on a detected signal strength of the two networks. Although the embodiment of FIG. 10 enables the wireless device 1000 to receive data from both cellular networks at the same time, transmission may occur over a single cellular network at a particular point in time. Thus, in some cases, the wireless device may not be a bi-directional dual-data dual-active device where both SIMs 802, 804 are simultaneously active for both transmission and reception. However, the processor 806 may rapidly (e.g., within a few microseconds or milliseconds) switch the SIM 802, 804 cards associated with the primary antenna 808 or the SIM 802, 804 that is active a particular point in time. In some such cases, the rapid switching of which SIM 802, 804 is active and/or which SIM 802, 804 is operating over the signal path that includes the antenna 808, may make it undetectable to a user that transmission is occurring via one of the cellular networks and not both cellular networks.

The switching of the active SIM 802, 804, or the SIM that is receiving and transmitting may be determined and/or performed by firmware This firmware may operate at the kernel or operating system level of the processor 806. The firmware may determine the active SIM 802, 804, or the SIM 802, 804 (and associated cellular network) to select for communication based on signal strength for the cellular networks. In addition, or alternatively, the SIM 802, 804 may be selected based on the available bandwidth, the quality of service of the connection, the stability of the connection, a cost associated with the cellular network or any other characteristics associated with the cellular networks or connections therewith.

In certain embodiments, the wireless device 1000 may lose connection for a short period of time (e.g., less than 30 seconds, within 5 seconds, within a second, and any value between the foregoing) when switching active SIM cards. In some such embodiments, the wireless device 1000 may be configured to not switch active SIMs during an ongoing phone call. Thus, in certain embodiments, a user may not lose voice service during a transition between networks.

Second Example Dual-SIM and Dual Data Active Device

Figure 11:
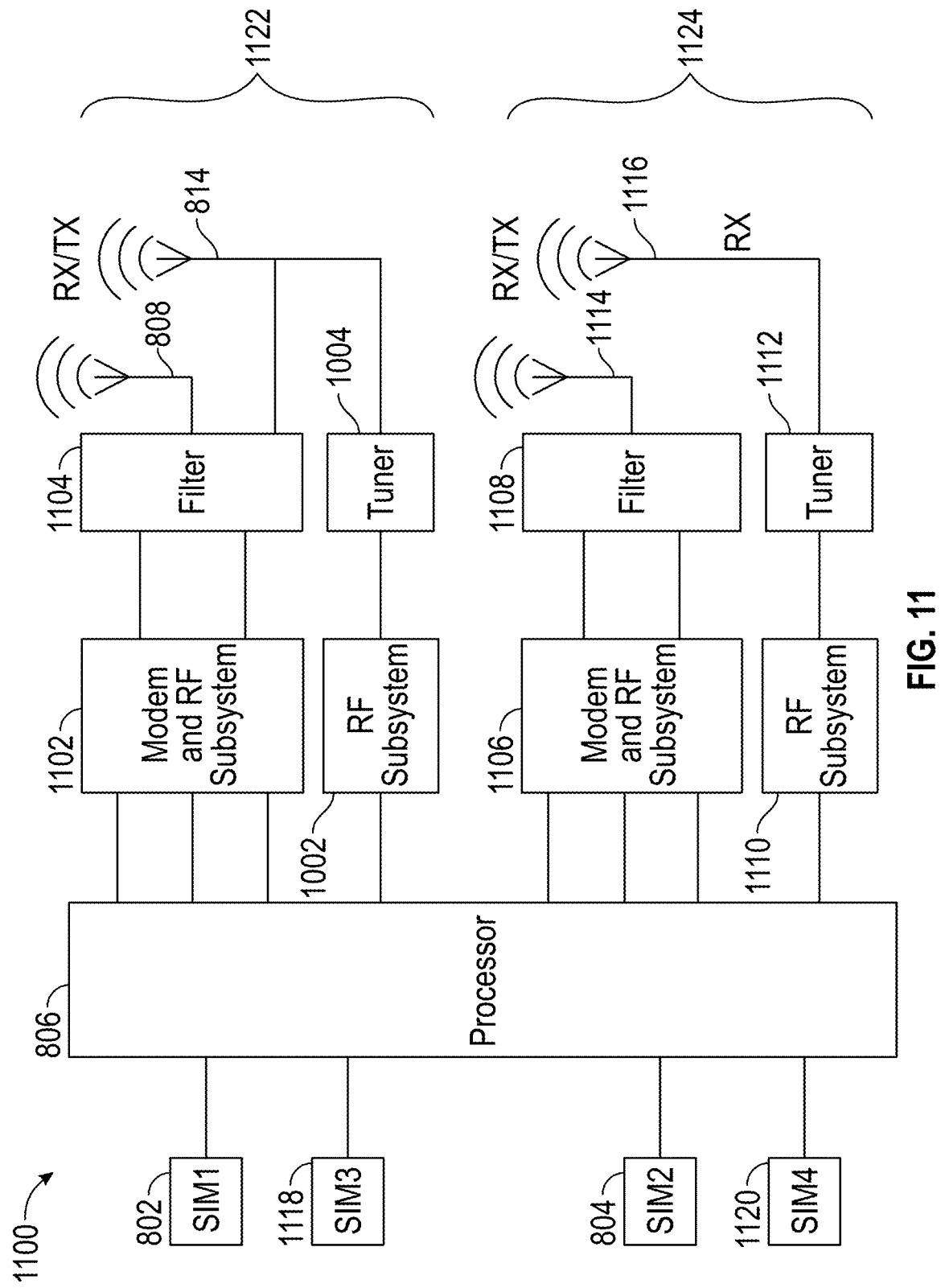
FIG. 11 illustrates a block diagram of a second example of a dual-SIM dual-data active wireless device in accordance with certain embodiments of the present disclosure.

FIG. 11 illustrates a second example of a dual-SIM dual-data active wireless device 1100 in accordance with certain embodiments. The wireless device 1100 of FIG. 11 includes a number of similar elements as the wireless devices 800 and 1000 as indicated by the re-use of certain reference numbers. As previously discussed, the wireless device 1000 may transmit over a single cellular network at a particular point in time. In contrast, the wireless device 1100 may have multiple active SIM cards and may communicate (e.g., both transmit and receive) with multiple cellular networks at a particular point in time. Thus, the wireless device 1100 may simultaneously receive and/or transmit signals using multiple cellular networks. The embodiments of FIG. 11 enables the wireless device to both receive and transmit over at least two cellular networks simultaneously, or at substantially the same time, by including a second pair of primary and diversity antennas. Further, the embodiment of FIG. 11 provides the ability to communicate with more than two cellular networks by replicating the features of the embodiments of FIG. 10.

The wireless device 1100 may include a modem and RF subsystem 1102 that combines the modem and RF subsystem previously described. It should be understood that the modem and RF subsystem may be implemented on a single die (as illustrated) or on multiple separate chips or dies. Further, the wireless device 1100 may include a filter 1104. The filter 1104 may include one or more filters that separate the desired frequency band from other received frequencies. For example, the filter 1104 may separate frequency bands associated with communication with a cellular network corresponding to the SIM 802 from frequency bands associated with communication with other cellular networks, such as those corresponding to SIMs 1118, 804, and 1120, respectively. The filter 1104 may provide the signals associated with the cellular network corresponding to the SIM 802 to the modem and RF subsystem while discarding the other signals. Alternatively, or in addition, the filter 1104 may filter out noise and undesired harmonics from the received signals. For example, in some cases, a second or third harmonic of a received RF signal may match the frequency of another communication band associated with another cellular network or with another wireless communication technology, such as Wi-Fi®. To reduce or prevent interference, the filter 1104 may filter out the undesired harmonic. It should be understood that the depiction of the separate filter 1104 and tuner 1004 is for illustrative purposes. In certain embodiments, the filter 1104 may be included as part of a tuner (not shown). Further, the tuner 1004 may include one or more filters. Accordingly, in certain embodiments the element 1104 may be replaced with a combined (or separate pair of) tuner and filter element. Similarly, the tuner 1004 may be replaced with a combined (or separate pair of) tuner and filter element.

The wireless device 1100 may include an upper portion 1122 and a lower portion 1124. The upper portion 1122 may be associated with a pair of SIMs 802, 1118 that correspond to a pair of cellular networks. Further, the upper portion 1122 may include similar elements and functionality as the wireless device 1000. Thus, the upper portion 1122 may receive signals from two different cellular networks associated with the SIMs 802, 1118, and can transmit at any particular point in time over one of the pair of cellular networks.

The lower potion 1124 may be a duplicate of the upper portion 1122. But the lower portion 1124 may be associated with a different pair of SIMs 804, 1120. In certain embodiments, both the lower portion 1122 and the upper portion 1124 of the wireless device 1100 may include and may be controlled by the processor 806. Further, each of the lower portion 1122 and the upper portion 1124 of the wireless device 1100 may separately receive and/or transmit to a cellular network corresponding to one of the active SIMs. Thus, in certain embodiments, the wireless device 1100 may receive communication from up to four cellular networks simultaneously. Further, the wireless device 1100 may transmit to up to two cellular networks simultaneously. Moreover, as with the wireless device 100, each of the upper portion 1122 and the lower portion 1124 may switch the active SIM enabling transmission with up to four cellular networks.

As illustrated, the lower portion 1124 may have its own primary antenna 1114 and diversity antenna 1116 pair. Alternatively, in certain embodiments, the upper portion 1122 and the lower portion 1124 may share access to one primary antenna (e.g., the primary antenna 808) and one diversity antenna (e.g., the diversity antenna 814).

As with the upper portion 1122, the lower portion 1124 of the wireless device may include a combined modem and RF subsystem 1106 or may separate the modem and RF subsystem. Further, the lower portion 1124 may include a filter 1108 that filters signals received by the primary antenna 1114 before providing the received signals to the modem and RF subsystem 1106. The signal path with the modem and RF subsystem 1106 and filter 1108 can both receive from and transmit signals to the cellular networks associated with the SIM 804 and the SIM 1120.

The lower portion may further include an RF subsystem 1110 and tuner 1112 that can receive signals via the diversity antenna 1116 from the cellular networks associated with the SIM 804 and the SIM 1120. In certain embodiments, the processor 806 communicates with the cellular networks associated with the SIM 802 and SIM 1118 using the upper portion 1122 of the wireless device 1100 and communicates with the cellular networks associated with the SIM 804 and SIM 1120 using the lower portion 1124 of the wireless device 1100. Thus, the elements of the upper portion 1122 and the elements of the lower portion 1124 may be configured to process specific signal bands and to use specific encodings corresponding to the two SIMs of the upper portion 1122 and the lower portion 1124, respectively. Advantageously, in certain embodiments, the segregating of the portions of the wireless device 1100 that communicate with the different cellular networks enables the modem and RF subsystems 1102, 1106 and the RF subsystems 1002 and 1110, as well as associated filters and tuners to be implemented using less circuitry.

Optionally, in certain embodiments, both the upper portion 1122 and the lower portion 1124 can communicate with some or all of the cellular networks corresponding to the SIMs 802, 1118, 804, and 1120. Advantageously, in certain embodiments, by enabling the upper portion 1122 and the lower portion 1124 to communicate with any of the cellular networks associated with the four included SIMs, the wireless device 1100 can transmit data packets or signals to any two of the cellular networks simultaneously.

Although the wireless device 1100 is illustrated as supporting up to four cellular networks, it should be understood that the wireless device 1100 can be modified to support more or fewer cellular networks. For example, the lower portion 1124 may include one SIM. As another example, an additional set of hardware may be included to enable communication with a fifth or sixth cellular network. In certain embodiments, the wireless device 1100 may require more power than the wireless device 1000 requiring a bigger battery and/or reducing battery life. However, the wireless device 1100 can support communication with a greater number of cellular networks. Further, in certain embodiments, the ability to communication with more cellular networks may in some cases reduce required power by providing increased flexibility to switch to a cellular network that has greater signal strength. For example, while the wireless device 1000 may select from up to two cellular networks, the wireless device 1100 may select from up to four cellular networks with which to communicate. As signal strength may vary based on the location of the wireless device, the wireless device 1100 may have more flexibility to select the cellular network with the strongest signal at a particular geographic area or time. In some cases, the increased flexibility may negate some of the increased power requirements of the wireless device 1100 compared to the wireless device 1000.

Third Example Dual-SIM and Dual Data Active Device

Figure 12:
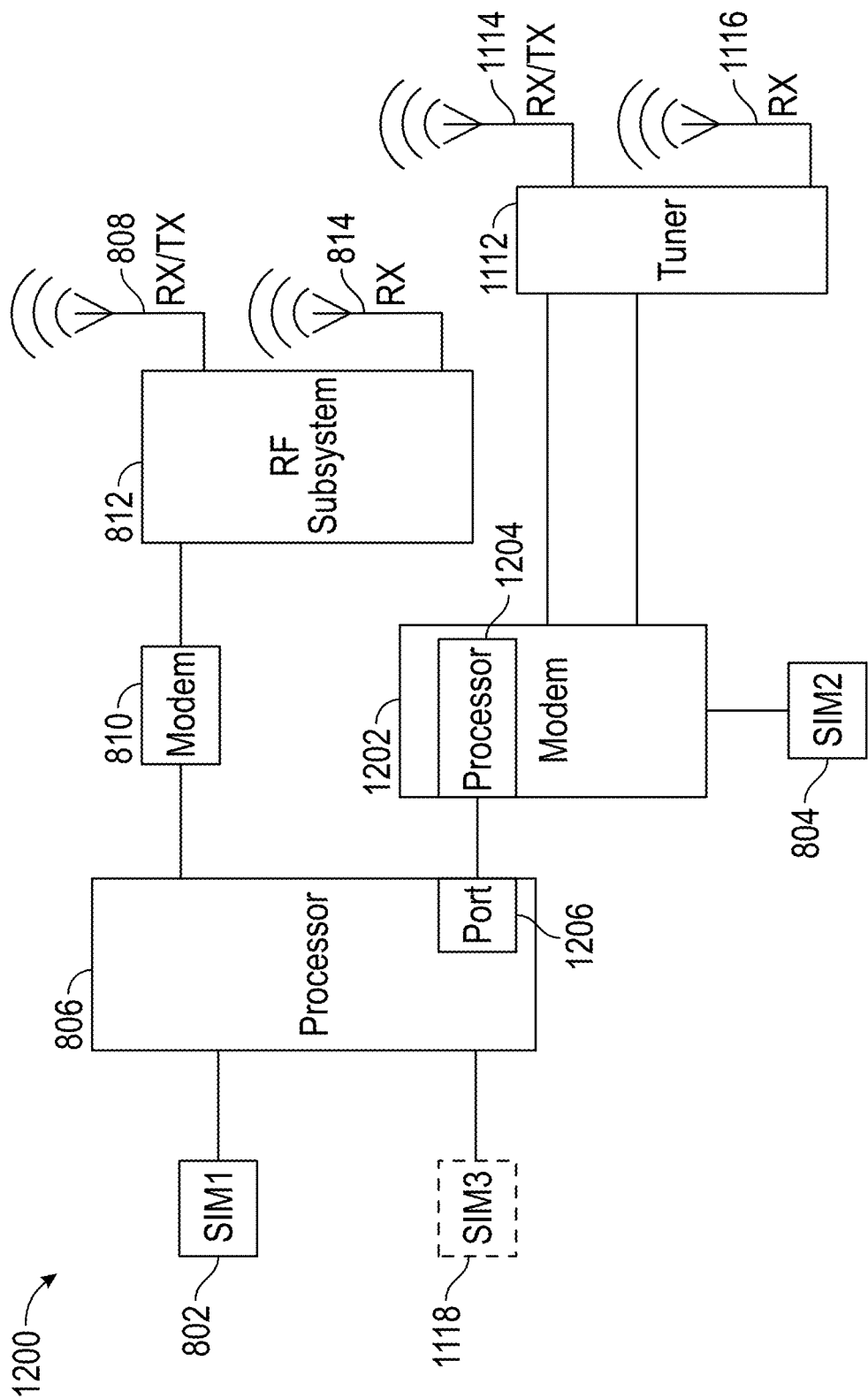
FIG. 12 illustrates a block diagram of a third example of a dual-SIM dual-data active wireless device in accordance with certain embodiments of the present disclosure.

FIG. 12 illustrates a third example of a dual-SIM dual-data active wireless device 1200 in accordance with certain embodiments. The wireless device 1200 of FIG. 12 includes a number of similar elements as the wireless devices 800, 1000, and 1100 as indicated by the re-use of certain reference numbers. The wireless device 1200 includes a second modem 1200 that enables transmission over a second cellular network using a second SIM 804 at substantially the same time as transmission or communication over a first cellular network using a first SIM 806. As a separate modem is within the signal path of the second primary antenna 1114, both primary antennas 808 and 1114 can transmit to two different cellular networks associated with two different SIMs (e.g., SIM 802 or 1118, and SIM 804, respectively). Although not illustrated, the modem 1202 may include an RF subsystem for processing received RF signals received by the primary antennas 1114 and/or the diversity antenna 1116. Further, the RF subsystem of the modem 1202 may facilitate transmission via the primary antenna 1114.

The second modem 1200 may include an embedded processor 1204 that can communicate with a port 1206, such as an auxiliary port or other reserved of the main or primary processor of the wireless device 1200. The port 1206 may be a pinout (e.g., pin 1010) or any other type of interface with the processor 806. In some embodiments, the main processor (e.g., processor 806) may support multiple SIM cards and thus, the wireless device 1200 may include a third SIM 1118 card. This third SIM card may be optional as indicated by the dashed line box for the SIM 1118. In some embodiments, the wireless device of FIG. 12 may further include the embodiment of FIG. 10.

Advantageously, in certain embodiments, the wireless device 1200 can have at least two active SIMs enabling communication with at least two cellular networks simultaneously. Further, the inclusion of multiple modems 810, 1202 enables transmission of data and/or voice packets by the wireless device 1200 to multiple cellular networks simultaneously. Further, in certain embodiments, the wireless device 1200 uses less power than the wireless device 1100.

The connection between the processor 1204 and the processor 806 may be a direct connection with a pin or port 1206 of the processor 806. In some cases, the connection between the processor 806 and the processor 1204 may be a conductive trace on a printed circuit board that includes both the processor 806 and the processor 1204.

In the wireless device 1200, the processor 806 may continue to serve as the main processor or the primary processor. Thus, for example, the processor 806 may select the cellular network with which to communicate for a particular task (e.g., a call or access to a content service). Further, the processor 806 may execute kernel level, operating system level, and application system tasks. In addition, the processor 806 may process user interactions with the wireless device 1200. The embedded processor 1204 may serve as a secondary processor. The processor 1204 may be at least partially controlled by the processor 806. Further, the processor 1204 may be a control host for the modem 1202.

Fourth Example Dual-SIM and Dual Data Active Device

Figure 13:
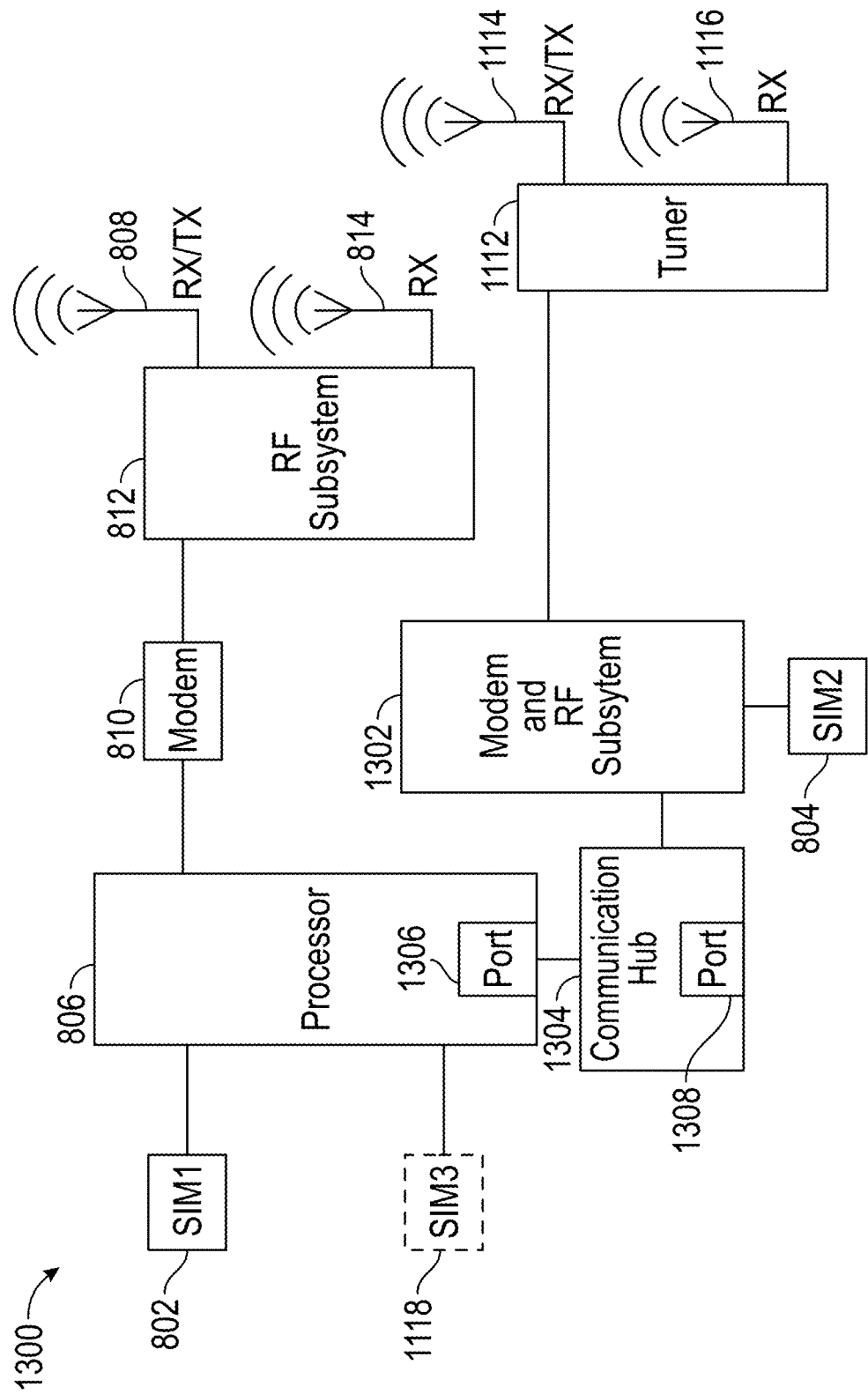
FIG. 13 illustrates a block diagram of a fourth example of a dual-SIM dual-data active wireless device in accordance with certain embodiments of the present disclosure.

FIG. 13 illustrates a fourth example of a dual-SIM dual-data active wireless device 1300 in accordance with certain embodiments. The wireless device 1300 of FIG. 13 includes a number of similar elements as the wireless devices 800, 1000, and 1100 as indicated by the re-use of certain reference numbers. The embodiments of FIG. 13 include an additional modem and RF subsystem 1302. The model and RF subsystem 1032 may be combined as a single chip as illustrated in FIG. 13, or may be implemented as two separate chips similar to elements 810 and 812. Further, the elements 810 and 812 may be replaced with a single chip that combines the mode and RF subsystem similar to the element 1302. Alternatively, the embodiment of FIG. 13 may include the modem 1202 and embedded processor 1204 of FIG. 12.

The modem and RF subsystem 1302 may communicate with a communication hub 1304. This communication hub 1304 may connect to the data transfer and/or battery charging port 1306 of the processor. Thus, in some such embodiments, the dual-SIM dual-data active features of the wireless device 1300 can be implemented without the addition of another port on the processor and/or without using an auxiliary port or repurposing an assigned or existing port of the processor 806. The data transfer and/or battery charging port 1306 may be a universal serial bus (USB) type port, such as a standard-size USB port, a mini-USB port, a micro-USB port, or a USB Type C port. It should be understood that the port 1306 is not limited to a USB-type port and that the port 1306 can include any type of port used by the wireless device 1300 for charging and/or data transfer. Further, the communication hub 1304 may replicate the data transfer and/or battery charging port 1306 of the processor 806 as the port 1308 of the communication hub 1304 enabling the wireless device 1300 to connect to an outlet or another port for data transfer via the port 1308 of the communication hub 1304. In certain embodiments, the communication hub 1304 may communicate wirelessly with the processor 806, such as via a Bluetooth® or other near-field communication protocol. However, to avoid interference with the communications with the cellular networks, the communication hub 1304 is typically configured to use a wired communication mechanism. As illustrated in the various figures, although described as a dual-SIM dual-data device, various implementations of the wireless devices may support more than two SIMs and/or may have more than two active SIMs actively communicating data packets with multiple cellular networks.

Second Example Communication Environment

Figure 14:
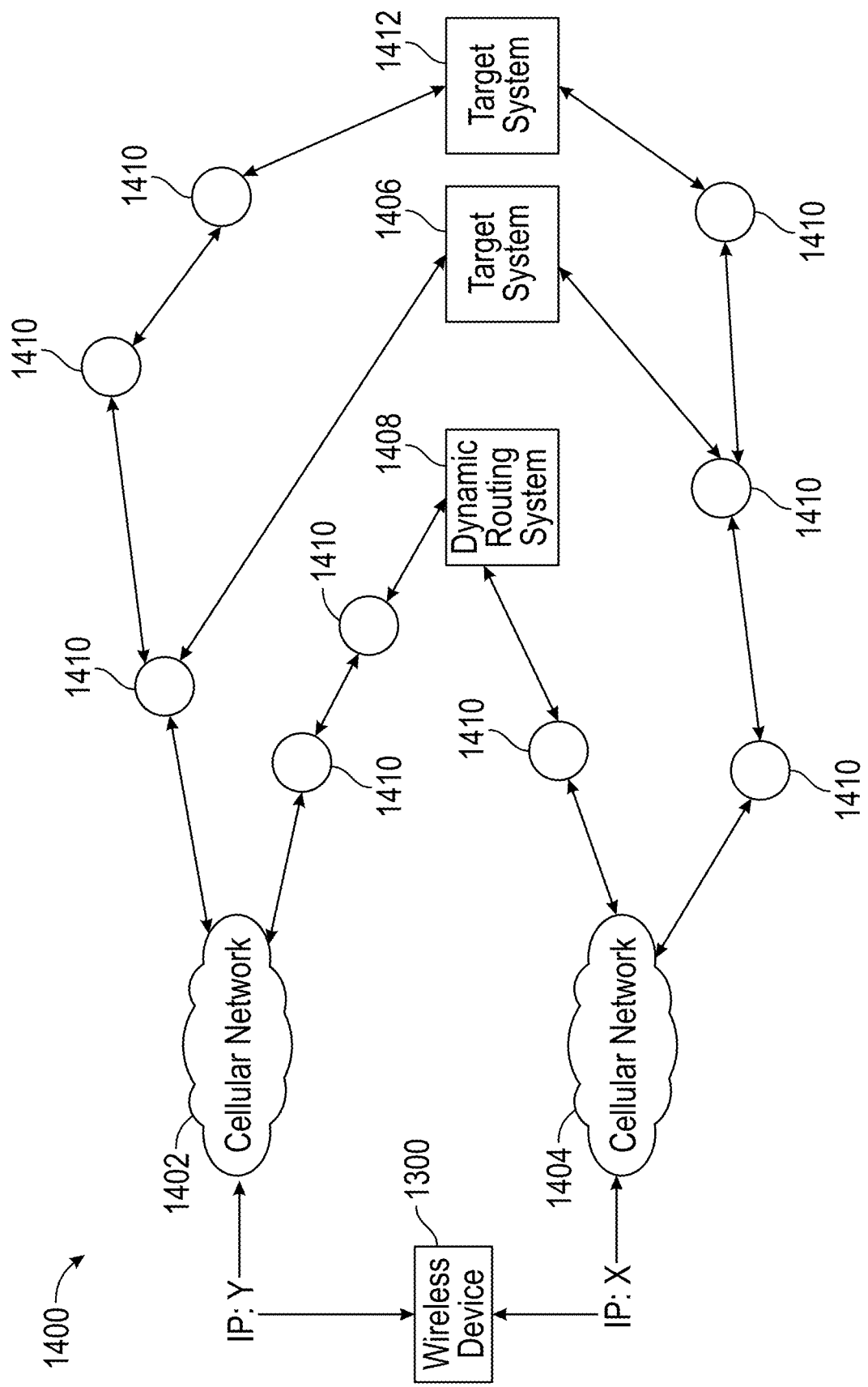
FIG. 14 illustrates an example communication environment for communicating using a dual-SIM dual-data active wireless device.

FIG. 14 illustrates an example communication environment 1400 for communicating using a dual-SIM dual-data active wireless device 1300. The wireless device 1300 may attempt to communicate with a target system 1406 and/or 1412 via the cellular networks 1402 and/or 1404. The wireless device 1300 may be substituted with any of the embodiments of the dual-SIM dual-data active wireless devices described herein. For example, the wireless device 1300 may be substituted with the wireless device 1000, 1100, or 1200. Although only two cellular networks 1402, 1404 and only two target systems 1406, 1412 are depicted, it should be understood that the present disclosure is not limited as such and that the communication environment 1400 may include more or fewer cellular networks and more or fewer target systems.

The target systems 1406, 1412 may include any device that can communicate with the wireless device 1300. For example, the target systems 1406, 1412 may each be another wireless device of the same type or of a different type as the wireless device 1300. Further, the target systems 1406 and 1412 may each be of the same type or of different types. As another example, the target systems 1406, 1412 may each be a server of a network-enabled service. For instance, the target systems 1406, 1412 may each be a server or host of a media streaming service, a data backup service, a shopping service or retailer (e.g., Amazon® or Walmart®), a picture printing service, an email service, and the like. In some cases, the target systems 1406, 1412 may each be a server or other computing device of an employer of a user who owns or uses the wireless device 1300.

The wireless device 1300, and any of the previously described wireless devices, may include any type of device that can communicate over a cellular network. For example, the wireless device 1300 may be or may include a smartphone, a tablet, a laptop, a wearable device (e.g., a smartwatch or smart glasses), or any other device that may include a SIM card and/or may communicate with a cellular network.

Using embodiments of the dual-SIM dual-data active wireless devices disclosed herein, it is possible to communicate over multiple cellular networks, which may be maintained by different entities or providers, and which may implement different technologies or use different frequency bandwidths. For example, as illustrated in FIG. 14, the wireless device may obtain an identifier, such as an Internet Protocol address from each wireless network or cellular network 1402, 1404. A different entity may own or operate each of the cellular networks 1402, 1404. For example, the cellular network 1402 may be Verizon's network and the cellular network 1404 may be Sprint's network. Further, each of the cellular networks 1402, 1404 may be configured to operate with different frequency bands, different communication standards or protocols, or using different types of hardware. Thus, it will often be the case that a prior art wireless device configured to communicate with cellular network 1402 will be unable to communicate with cellular network 1404, or vice-versa. However, the wireless device 1300, and other wireless devices described herein, may communicate with either or both cellular networks 1402, 1404. Further, the cellular networks 1402, 1404 may include one or more of the embodiments previously described with respect to the communication networks 106. In some cases, the cellular networks 1402, 1404 may be data networks configured to transmit data packets. These data packets may include any type of data. Further the data packets may include or encapsulate voice data. In some cases, the cellular networks 1402, 1404 may transmit both data packets and voice packets. The cellular networks 1402, 1404 may be configured to use different communication technology, protocols, or frequency bands. For example, the cellular networks 1402, 1404 may be 2G, 3G, 4G, 4G LTE, or 5G cellular networks that can communicate with the wireless device 1300 using various corresponding frequency bands or encodings.

As stated above, the wireless device 1300 may communicate with the target system 1406 via one, or in some cases both, of the cellular networks 1402, 1404. Further, as stated above, the target system 1406 may be another wireless device, such as in the case when a user is calling another user, or the target system 1406 may be a host server, such as when the user is accessing content from a website or other services provider, such as a streaming media service. The wireless device 1300 may determine whether to communicate with the target system 1406 based on one or more characteristics of the cellular networks 1402, 1404 and/or the connections to the cellular networks 1402, 1404. For example, the wireless device 1300 may determine the signal strength of a connection to each of the cellular networks 1402, 1404 and select one of the cellular networks 1402, 1404 with which to establish a connection with the target system 1406 based on the signal strength. The wireless device 1300 may then make the corresponding SIM within the wireless device the active SIM to enable communication with the selected cellular network. In some cases, the wireless device 1300 may maintain multiple active SIMs enabling communication over both the cellular networks 1402, 1404 at the same time, or substantially the same time. For example, the wireless device 1300 may communicate with the target system 1406 using the cellular network 1402 and communicate with the target system 1412 using the cellular network 1404.

In some embodiments, the wireless device 1300 may connect to the dynamic routing system 1408 using one or more of the cellular networks 1402, 1404. The dynamic routing system may include one or more of the embodiments described with respect to the dynamic routing system 108. The wireless device 1300 may provide the dynamic routing system 1408 with a measurement of signal strength between the wireless device 1300 and a base station of each of the cellular networks 1402, 1404. Alternatively, the dynamic routing system 1408 may determine the measurement of signal strength associated with the wireless device's 1300 connection to each cellular network 1402, 1404 from a system of each of the cellular networks 1402, 1404. For example, a base station, routing system, or connection server of each of the cellular networks 1402, 1404 may provide the signal strength information to the dynamic routing system 1408.

As previously stated, the wireless device 1300 may determine the cellular networks 1402, 1404 with which to connect to the target system 1406. In other cases, the dynamic routing system 1408 may determine the cellular network 1402, 1404 the wireless device 1300 should use to communicate with the target system 1406. The dynamic routing system 1408 may select the cellular network 1402, 1404 based at least in part on the signal strength between the wireless device 1300 and the cellular networks 1402, 1404. Alternatively, or in addition, the dynamic routing system 1408 may select the cellular network 1402, 1404 based on other connection characteristics or service level agreements.

For example, the dynamic routing system 1408 may select the cellular networks 1402, 1404 based at least in part on one or more of available bandwidth, stability of connection between the wireless device and each cellular networks, priority of traffic or data packets, type of data packet (e.g., voice data packets, media data packets, email, and the like), destination or source of the data sent or received, bandwidth costs associated with the connection, monetary costs associated with the connection, user preferences (e.g., a user may prefer a particular network due, for example, to costs, balancing of vendor usage, brand loyalty, or idiosyncrasies, and the like).

The dynamic routing system 1408 may inform the wireless device 1300 of the preferable or selected cellular network 1402, 1404 or wireless network provider, with which to communicate with the target system 1406. The wireless device 1300 may make the SIM (e.g., SIM 802, 804) card associated with the preferred or selected cellular network active for performing a desired task (e.g., communicating with the target system 1406). In some cases, additional SIM cards may remain active at the wireless device 1300 and may be used to communicate with a corresponding cellular network 1404 to perform another task (e.g., communication with the target system 1412). In some embodiments, the cellular networks 1402, 1404 may be ranked based, for example, on signal strength, bandwidth, stability, and the like, or based on a combination of characteristics. The higher ranked cellular network may be used to perform a task with higher priority. For example, a phone call may be considered higher priority than other tasks, such as media download. In this example, if the signal strength associated with cellular network 1402 exceeds the signal strength associated with cellular network 1404, the phone call may be processed using the cellular network 1402 and the media download, or other task, may be performed using the same network, or may be performed using the cellular network 1404. The determination of whether to divide tasks among networks or to use the same network may depend on the specific task and/or the difference in characteristics between the cellular networks.

Alternatively, or in addition, the higher ranked cellular network may be used to perform a task that requires greater bandwidth or stability, but may or may not be a higher priority task. For example, a voice call usually requires less bandwidth than many other tasks, such as downloading a high-definition (HD) movie. Thus, although the cellular network 1402 may provide a better connection or be associated with higher signal strength, the voice call may be assigned to the cellular network 1404 and the media download to the cellular network 1402. In some cases, whether or not a task is assigned to a particular cellular network may further depend on whether the connection or signal strength is sufficient to provide a minimal quality of service for the task. For example, continuing the previous example, although the voice call may require less bandwidth than the media download task, if the connection to the cellular network 1404 is not strong enough to maintain a clear voice call, the voice call may be allocated, with or without the media download task, to the cellular network 1402.

In certain embodiments, the wireless device 1300 may determine whether a data packet belongs to a particular task for transmission over a particular cellular network 1402, 1404 based on the source or application of the data packet. For example, data packets related to a voice call may be identified based on the source of the data packet being from a dialer application and/or based on the dialer application applying a label or tag to the data packet that identifies the data packet as being for a call (e.g., a voice over data or voice over LTE packet).

Over time, or as the wireless device 1300 is moved, the determination of the cellular network to perform a particular task or over which to maintain or establish a connection with a target system 1406, 1412 may change. If the selected cellular network 1402, 1404 changes, the wireless device 1300 may establish a new connection over the newly selected cellular network, or may use an existing connection with the newly selected cellular network to perform a task, which may be a new task or a task-in-progress (e.g., an existing call or download). To switch an existing task, or task-in-process, associated, for example, with the target system 1406 from one cellular network 1402 to another cellular network 1404, the wireless device 1300 may establish a new connection with the cellular network 1404. The task may be switched to the newly established connection with the cellular network 1404. The connection with the cellular network 1402 may then be dropped, or may be maintained, but may no longer be used to perform the task associated with the target system 1406. The determination of whether to switch cellular networks to perform a task at a particular point in time may be determined based, for example, on the changing signal strength of connections with the cellular networks 1402, 1404, changing bandwidth available, changing connection stability, or any other characteristic of the connections to the cellular networks 1402, 1404. Further, in some implementations, the wireless device 1300 may change the cellular networks used to perform a task when a change in connection characteristics exceeds a threshold or when the connection characteristics associated with a particular cellular network exceeds another cellular network by more than a threshold amount or percentage. Advantageously, in certain implementations, by requiring a threshold change or difference between cellular network characteristics, bouncing between cellular networks or cellular network connections may be reduced or prevented.

In some embodiments, the wireless device 1300, or the dynamic routing system 1408, may maintain a connection to a target system (e.g., the target system 1406) using both cellular networks 1402, 1404 and corresponding SIM cards of the wireless device 1300. The wireless device 1300 may communicate over the preferred cellular network (e.g., the cellular network with a higher signal strength connection to the wireless device 1300). As the user of the wireless device 1300 moves (e.g., drives down the road), the preferred cellular network may change. In some such cases, the wireless device 1300 may switch to the new preferred cellular network using the connection previously established with the new preferred cellular network and maintained throughout the time, or for at least some of the time, that the wireless device 1300 was communicating over the original preferred cellular network.

In some embodiments, the dynamic routing system 1408 may maintain the connection to the target system 1406 via both cellular networks 1402, 1404. As the preferred cellular network for the wireless device 1300 to communicate with the target system 1406 changes, the dynamic routing system 1408 may transition the connection with the wireless device 1300 from the previously preferred cellular network to the currently preferred cellular network. As both connections are maintained, the transition between cellular networks may be performed without service being interrupted.

The communication environment 1400 may include a number of nodes 1410. Each of the nodes 1410 may be the same or may differ in type. The nodes 1410 may represent different nodes or hops within a network. At least some of the nodes 1410 may be part of the cellular networks 1402 and/or 1404. Alternatively, at least some of the nodes 1410 may be part of another network in communication with the cellular networks 1402, 1404. In some embodiments, the number of nodes or hops between the wireless device 1300 and the target system 1406, 1412, or the amount of time to communicate between nodes or hops, may be a factor in determining whether the cellular network 1402 or the cellular network 1404 is selected to connect to a target system 1406, 1412. For example, the connection between the wireless device 1300 and the cellular network 1404 may be associated with a higher signal strength than the connection to the cellular network 1402. However, the connection to the cellular network 402 may be preferred because there are less hops to the target system 1406 using the cellular network 1402 than the cellular network 1404. Thus, in some cases, the particular target system with which the wireless device 1300 desires to connect, or the connection characteristics with the target system may be a factor in selecting the cellular network with which the wireless device 1300 connection to the target system 1406.

Each of the previously described embodiments, or aspects, may be combined or implemented separately. For example, the wireless device 1200 or 1300 may implement aspects of the wireless device 1000 enabling the signal paths associated with the process 806 to support two SIMs and two corresponding cellular networks while the signal paths associated with the modem 1202 or 1302 may simultaneously support one or two SIMs and the one or two corresponding cellular networks. Accordingly, the wireless device 1200 may support dual active dual data communication across at least two cellular networks.

Additional Example Implementations

Figure 15:
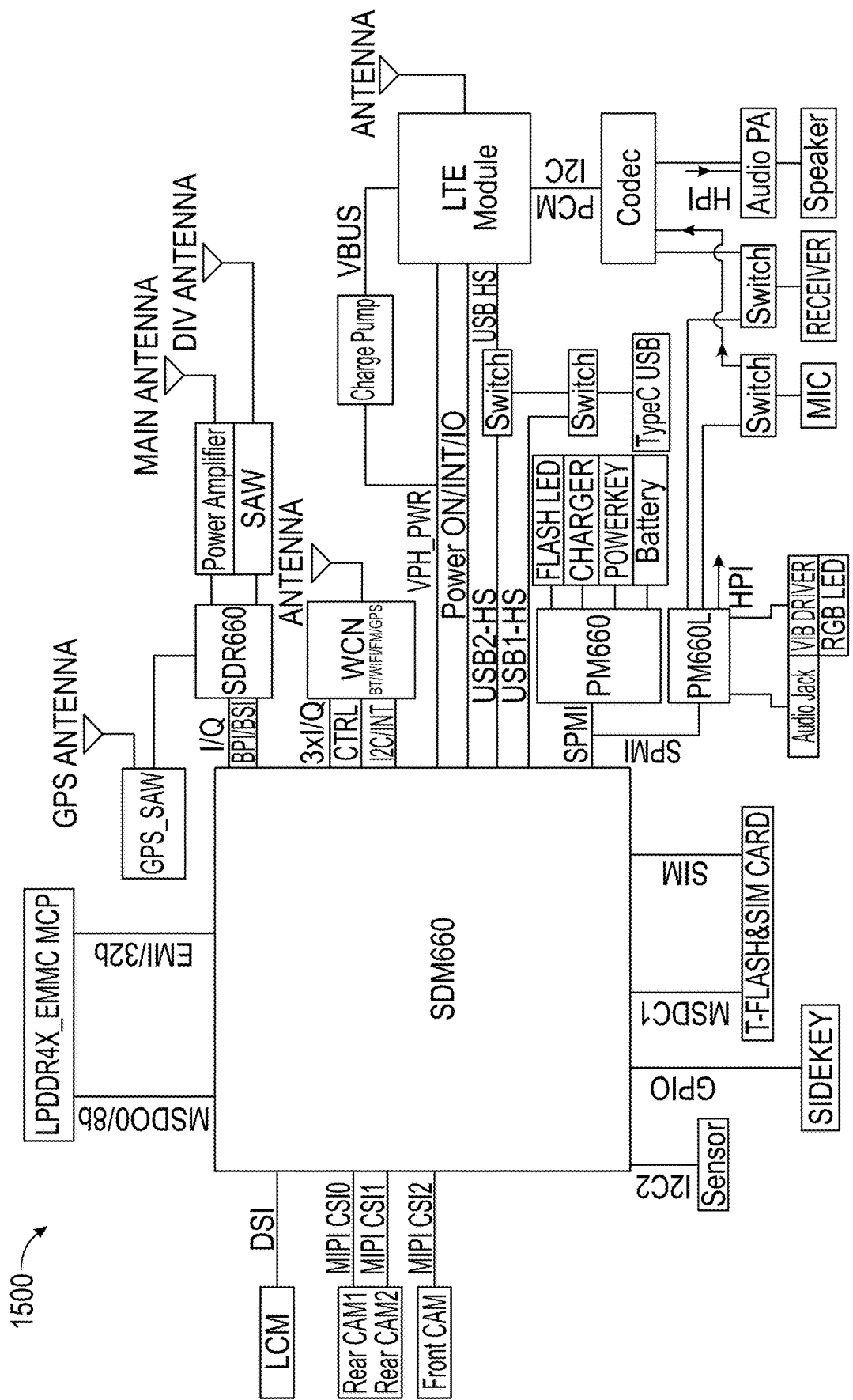
FIG. 15 illustrates an example device-level implementation of a dual-SIM dual-data active wireless device in accordance with certain embodiments of the present disclosure.

FIG. 15 illustrates an example device-level implementation of a dual-SIM dual-data active wireless device 1500 in accordance with certain embodiments of the present disclosure. As illustrated, the wireless device 1500 may include an additional receiver (e.g., the LTE module) and antenna that can communicate with a different cellular network than the main antenna. Thus, wireless device 1500 can maintain two active data communication streams. One communication data stream can be using a first SIM to communicate with a first cellular network and a second communication data stream can be using a second SIM to communicate with a second cellular network. Moreover, each of the data streams can encapsulate voice data enabling either cellular network to be used for a voice call. In some embodiments the codec connected to the LTE module may be optional or omitted. Further, the switches connected to the codec may also be optional or omitted. The data packets received at the LTE module may be communicated to the main processor (e.g., the SDM660 from Qualcomm®) using the universal serial bus (USB) connection to the main processor. The connection type is not limited, and other types of connection types may be used. For example, the USB connection may instead be an electrical serial bus interface standard based connection such as inter-IC sound (I2S). As another example, the USB connection may be replaced with a universal asynchronous receiver-transmitter (UART) connection.

Shadow Number

Figure 16:
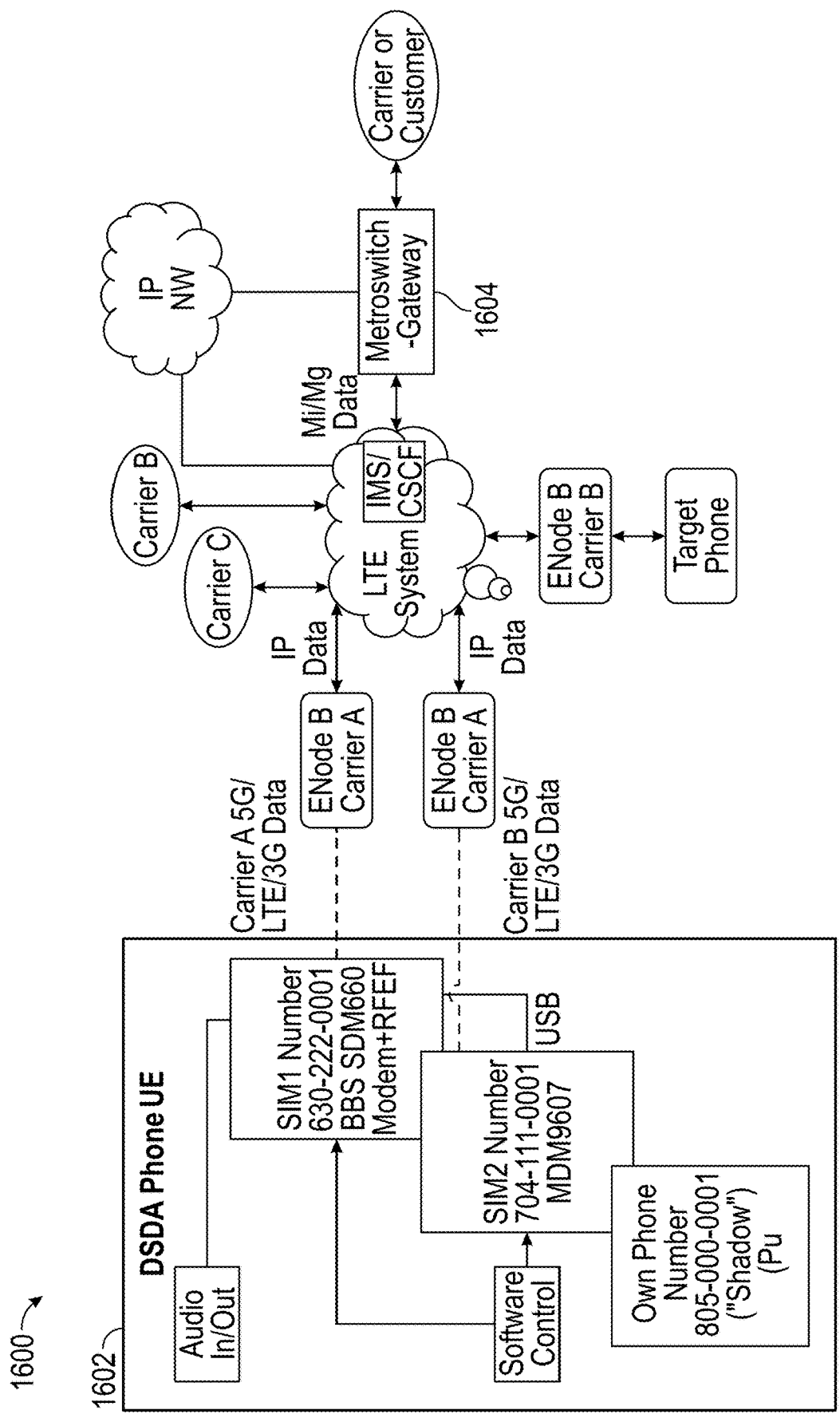
FIG. 16 illustrates an example communication environment for communicating using a dual-SIM dual-data active wireless device with a single phone number in accordance with certain embodiments of the present disclosure.

FIG. 16 illustrates an example communication environment 1600 for communicating using a dual-SIM dual-data active wireless device 1602 with a single phone number in accordance with certain embodiments of the present disclosure. As illustrated, the wireless device 1602 can support multiple SIM cards. Further, the wireless device 1602 can support dual active data. In other words, both SIM cards may be active simultaneously enabling communicate over multiple cellular networks simultaneously, or substantially at the same time.

As previously described, each SIM card may be associated with a different cellular network. Further, each SIM card may be associated with a different phone number. It can be inconvenient to have multiple active phone numbers because a caller may not know which number to dial to reach a user. Similarly, the user may be unsure which number to share with potential callers because the user may not know which cellular network will be preferred at a particular time or location. In certain embodiments, the wireless device and/or the user may be assigned a single phone number, or a shadow number, that can be used to identify the wireless device 1602. When a caller desires to contact the user of the wireless device 1602, the caller may dial the shadow number. This shadow number may be associated with a dynamic routing service. This dynamic routing service may include a dynamic routing system 1604 (e.g., the Metroswitch Gateway from MetroSwitch Technologies™). When a call is received from the caller (e.g., the target phone) at a cellular network, the cellular network may identify the target number (e.g., the shadow number) as being associated with the dynamic routing service. The call (or information about the call) may be forwarded to the dynamic routing system. The dynamic routing system 1604 may determine that the target number is a shadow for, or is associated with, the numbers assigned to the user of the wireless device 1602. The dynamic routing system may determine the optimal cellular network to route the call based, for example, on the signal strength of the connections of the cellular networks to the wireless phone 1602. If it is determined that the cellular network associated with the SIM1 is preferred, the call may be routed over the cellular network (e.g., Carrier B) associated with SIM1. Similarly, if it is determined that the cellular network associated with the SIM2 is preferred, the call may be routed over the cellular network (e.g., Carrier C) associated with SIM2. In either case, the number associated with the selected SIM may be substituted by the dynamic routing system for the shadow number (e.g., the Own Phone Number of FIG. 16) that was used by the caller to initiate the call. Alternatively, or in addition, the call may be routed over a data connection to the wireless device 1602. It should be understood that a similar process can be used for establishing a voice or data connection with either a caller or other network-based service (e.g., streaming data service).

Similarly, when a user of the wireless device 1602 attempts to establish a call, regardless of which cellular network is selected, and which associated SIM card is used, the shadow number may be presented. Thus, caller id and other services may use the shadow number enabling the consistent use of a single number despite varying numbers and cellular networks used for communication. When a user makes a call, or a data connection, the number is identified by the associated carrier as being associated with the dynamic routing service. The number presented to a target recipient may be switched by the associated carrier to the shadow number. Alternatively, the call or data connection may be provided to the dynamic routing system for further processing and routing. The dynamic routing system may then substitute the phone number (e.g., the number associated with SIM1 or SIM2) with the shadow number (e.g., the Own Phone Number of FIG. 16). In some cases, the call may be made over a data connection. If the data connection is determined to be below a particular call quality, or if a signal strength associated with the call is below a threshold, a voice call may be initiated using one of SIMs (e.g., SIM1 or SIM2).

In some embodiments, the dialer, user interface, or the software controller of the wireless device 1602 may be modified to output a shadow number assigned to a user or wireless device 1602 upon a user initiating a call using the wireless device 1602. Thus, when a user dials a number associated with another user (e.g., places a call to a target phone), the packet data may include the shadow number. This call, or packet data, may be forwarded or transmitted to a gateway or dynamic routing system 1604.

The dynamic routing system 1604 may determine a carrier to process the call based on one or more carrier characteristics, such as those described in U.S. Pat. No. 9,124,957, incorporated by reference above. For example, the call may be routed based on signal quality, cost, priority, payment terms, quality of service level, location of target caller, and the like. The dynamic routing system 1604 may forward the call to the selected carrier to complete the call connection. For example, the dynamic routing system 1604 may forward the call to one or Carrier B or Carrier C. These carriers may be associated with a different entity than the dynamic routing system 1604. Alternatively, or in addition, the dynamic routing system 1604 may cause the call connection to be completed using a call network associated with the same entity as the dynamic routing system 1604. When the call information is forwarded to a carrier to complete the call connection, the dynamic routing system 1604 may continue to present the shadow number. It should be understood that this shadow number may not be assigned or owned by any of the carriers, but may instead be a number owned or assigned by an entity that controls the dynamic routing system 1604. In some such cases, the dynamic routing system 1604 may substitute a number associated with the selected carrier for the shadow number such that the carrier is not aware that a shadow number is being used. In some such cases, the call may continue to be routed through a network of the dynamic routing system 1604 as an intermediary. In other cases, the shadow number may continue to be used and upon the call connection being established, the call may continue directly between the wireless device 1602 and the selected carrier without further interaction with the dynamic routing system 1604.

When attempting to initiate a call, the wireless device 1602 may initially determine, using for example a call controller or call control software executed by a hardware processor, whether to establish the call over a data network (e.g., a VoIP call). In some cases, the wireless device 1602 may determine whether to make a call over a data network, a voice network, or using one of a plurality of networks supported by the wireless device 1602 associated with one of a plurality of SIMs of the wireless device 1602 by measuring signal strength of each of the connection options. The signal strength may be measured using any of the previously described embodiments herein. For example, a diversity antenna may be used to measure a signal strength for a network. The signal strength of each network may be measured by rotating between active networks, measuring the signal strength, and selecting the network with the best signal strength. Alternatively, one network may be active while the signal strength of an alternative network is measured. The wireless device 1602 may switch active networks if determining the alternative network has a higher signal strength.

The wireless device 1602 may present the shadow number as the originating number of the call. If the wireless device 1602 determines that the quality of the call over the data network is below a threshold quality, the wireless device 1602 may instead attempt to connect the call by dialing a number associated with a SIM of the wireless device 1602. This SIM may be one of one or more SIMs supported by the wireless device 1602 (e.g., SIM1 or SIM2). The call connection may be a voice connection or a data connection over a cellular network (e.g., a 4G or 5G connection).

The call may output a number associated with the SIM (e.g., 603-222-0001) instead of the shadow number (e.g., 805-000-0001) that is output when attempting to establish the data connection. For example, the voice packets may include the number associated with the SIM as the originating number. The call may be connected with the dynamic routing system 1604. In some cases, the voice packets are directed or transmitted to the dynamic routing system 1604. The dynamic routing system 1604 may determine that the number included in the voice packets is associated with the SIM, and that the SIM is associated with the same account as the shadow number. The dynamic routing system 1604 may substitute the number associated with the SIM with the shadow number such that the shadow number is presented to a selected carrier (e.g., a carrier selected based on the calling number, or one or more of the previously described routing factors) and/or the target phone of the user being called. Thus, although the originating user, or the wireless device 1602 associated with the originating user may be associated with multiple numbers and/or may communicate over multiple carriers associated with different numbers, a single number may be presented.

Figure 17:
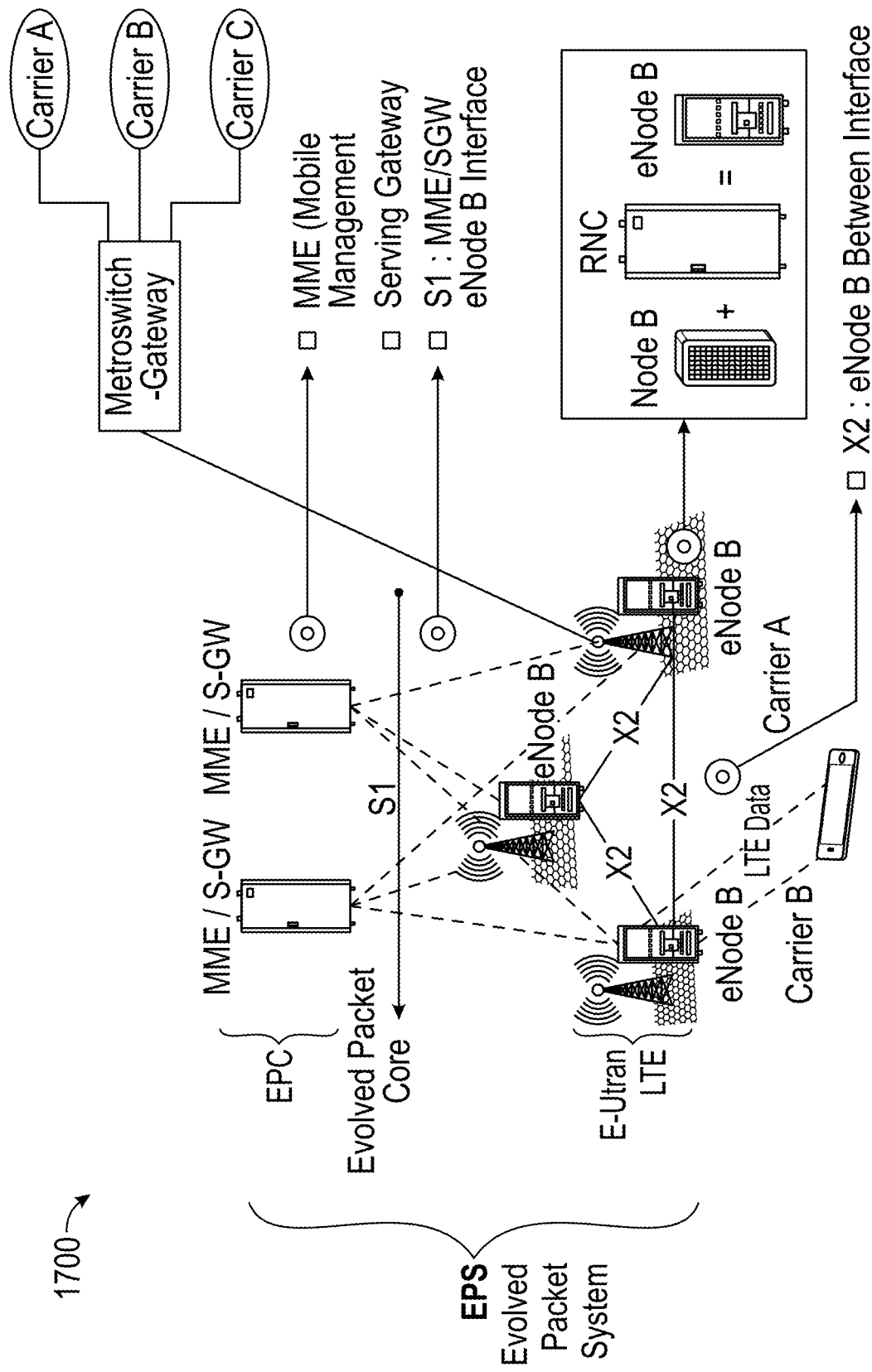
FIG. 17 illustrates an example communication environment with a dynamic routing system for communicating using a dual-SIM dual-data active wireless device in accordance with certain embodiments of the present disclosure.

FIG. 17 illustrates an example communication environment with a dynamic routing system for communicating using a dual-SIM dual-data active wireless device in accordance with certain embodiments of the present disclosure. As illustrated, when a base station of a network (e.g., an LTE network) receives a call from a dual active data supporting wireless device that supports multiple cellular networks, the base station, or supporting systems of the carrier, may determine that the caller is associated with a dynamic routing service. This determination may be based on the phone number of the caller or other information that may be embedded into data packets from the wireless device. The base station, or supporting systems, may cause the call, or information thereof, to be transferred to the dynamic routing system (e.g., the Metroswitch Gateway). The dynamic routing system can then determine the preferred number or carrier for the wireless device to communicate. The dynamic routing system may then cause the wireless device to communicate with the preferred carrier (e.g., based on signal quality or cost) by either maintaining an existing connection with the initial carrier, or causing the wireless device to switch active SIMs and to communicate with an alternative carrier or cellular network. In some cases, the wireless device may maintain the connection to the initial carrier's cellular network and initiate a connection to the second carrier's cellular network.

Figure 20:
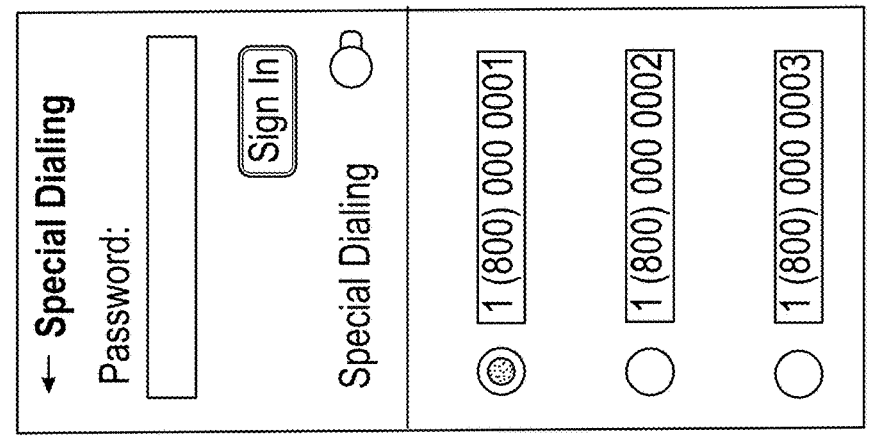
FIG. 20 illustrates an example user interface of a wireless device that may support a shadow number.
Figure 20:
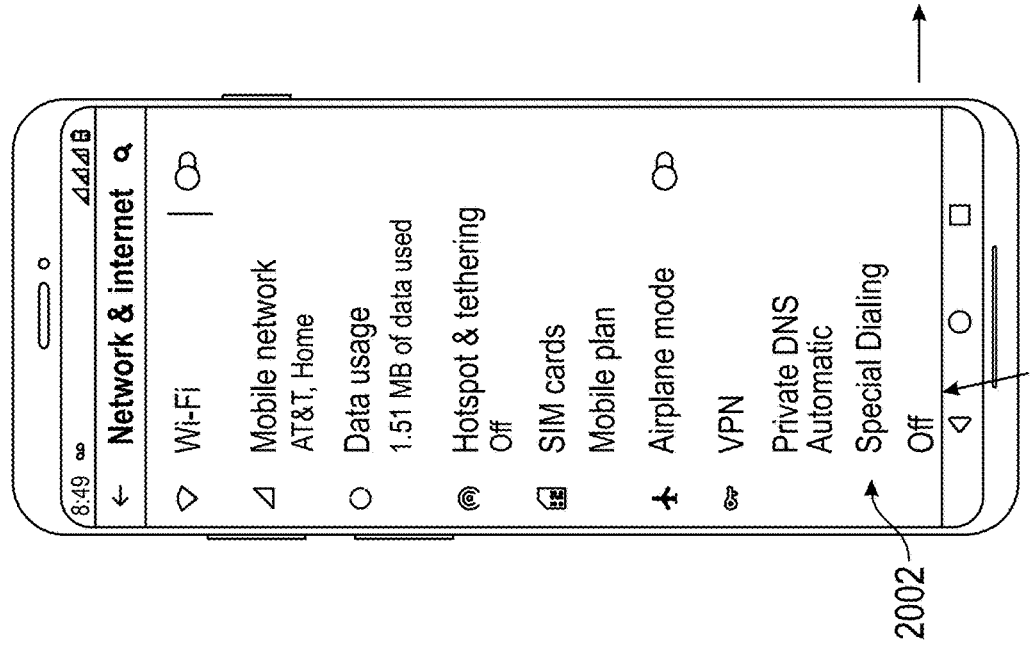

FIG. 20 illustrates an example user interface 2000 of a wireless device 1602 that may support a shadow number. As illustrated, the user interface 2000 may be accessed from a settings screen by, for example, activating a special dialing feature via a user interface feature 2002 (e.g., a link, button, or slider UI feature).

The user interface 2000 may include a password interface to prevent unauthorized or accidental modification of the shadow number, or of numbers associated with the shadow number. Further, the password interface may be used to provide access control for activating or deactivating use of the shadow number. In some cases, the password interface may be optional or omitted. For example, in some cases, usage of the shadow number feature may be controlled by a carrier or on the carrier side, or via a separate network interface (e.g., a webpage) available to the user. As another example, the usage of the shadow number may not be an access control (e.g., password) protected feature.

The user interface 2000 may further include one or more UI elements that present one or more phone numbers associated with the shadow number. These phone numbers may be numbers may include numbers associated with one or more SIMs of the wireless device 1602. In some cases, the numbers may also include an identity of the shadow number. For example, the first listed number may be the shadow number, and the second and third listed numbers may numbers associated with SIM1 and SIM2, respectively. In some cases, the user interface 2000 enables a user to select the number that is the shadow number, and/or a number that is presented when establishing a call regardless of the actual number or network used to make the call. Thus, in some cases, the shadow number may be a number associated with one of the carriers supported by the wireless device 1602. For example, the shadow number may also be the number associated with Carrier B or SIM2. Alternatively, the shadow number may not be associated with any of the carriers or SIM cards, and may serve as a substitute for all of the numbers supported by the wireless device 1602. In either cases, as previously described, the dynamic routing system 1604 may control or direct routing of the call over a network associated with a number associated with one of the SIMs while presenting the shadow number as a substitute for the number at the carrier and/or at the originating and/or target wireless device or phone.

Second Additional Example Implementations

Figure 18:
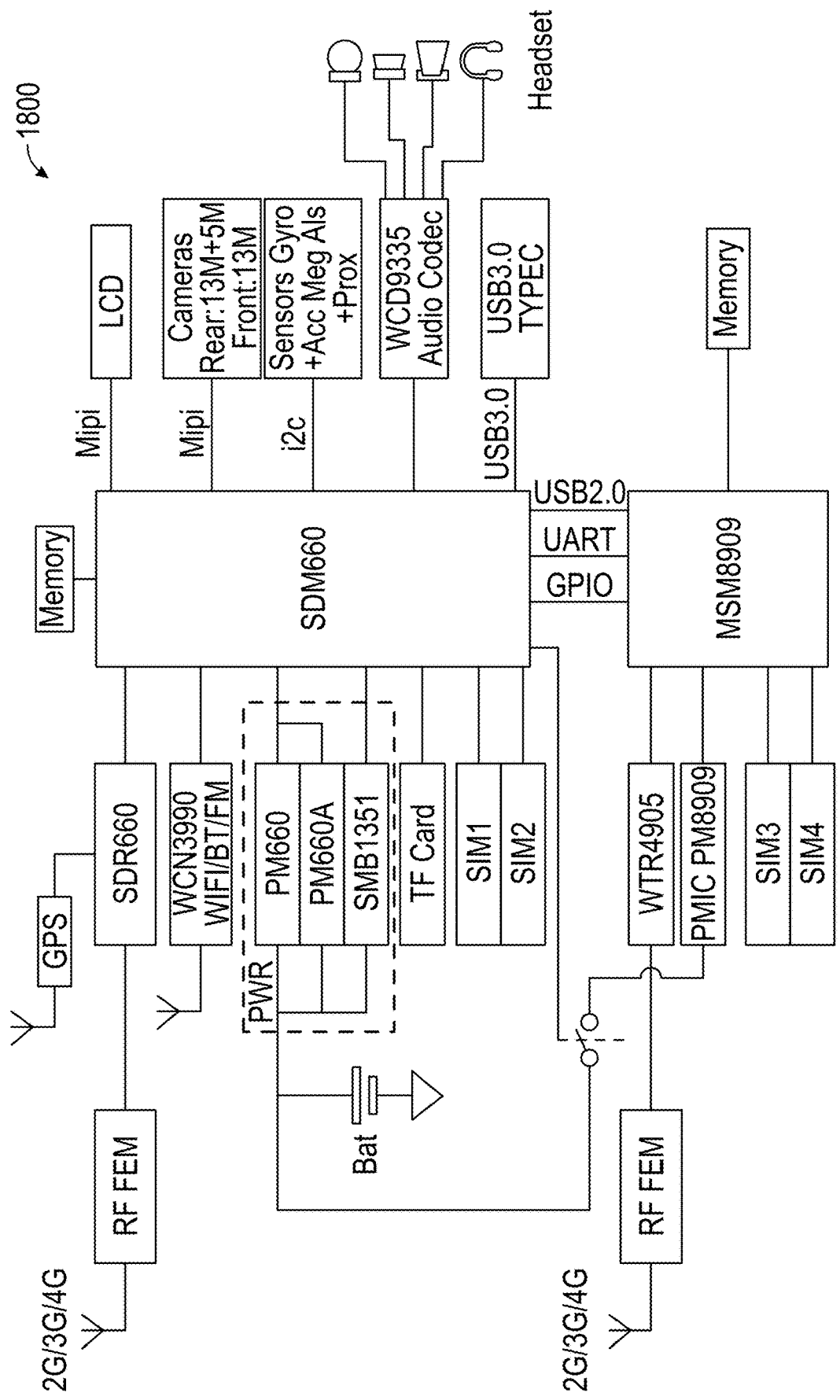
FIG. 18 illustrates a second example device-level implementation of a dual-SIM dual-data active wireless device in accordance with certain embodiments of the present disclosure.

FIG. 18 illustrates a second example device-level implementation of a dual-SIM dual-data active wireless device 1800 in accordance with certain embodiments of the present disclosure. The wireless device 1800 includes a secondary communication path that interfaces with a secondary processor (e.g., the MSM8909 from Qualcomm®). In the wireless device 1800, each processor can support up to two SIM cards. Thus, the wireless device 1800 can support up to four cellular networks. Further, the secondary processor can communicate with the primary or main processor (e.g., the SDM660) via a USB interface, or other communication interface, such as I2S, UART, general purpose input-output (GPIO) interfaces. Each communication path within the wireless device 1800 may have its own RF front-end-module (FEM) and main antenna. Accordingly, each communication path may separately transmit and receive data and/or voice packets. Thus, at least two SIMs may be active simultaneously. Further, each processor can separately process data for transmission and/or received data. The secondary processor may transmit and/or receive data using the lower RF FEM and antenna in FIG. 18, and the primary processor may transmit and/or receive data using the upper RF FEM and antenna in FIG. 18.

Figure 19:
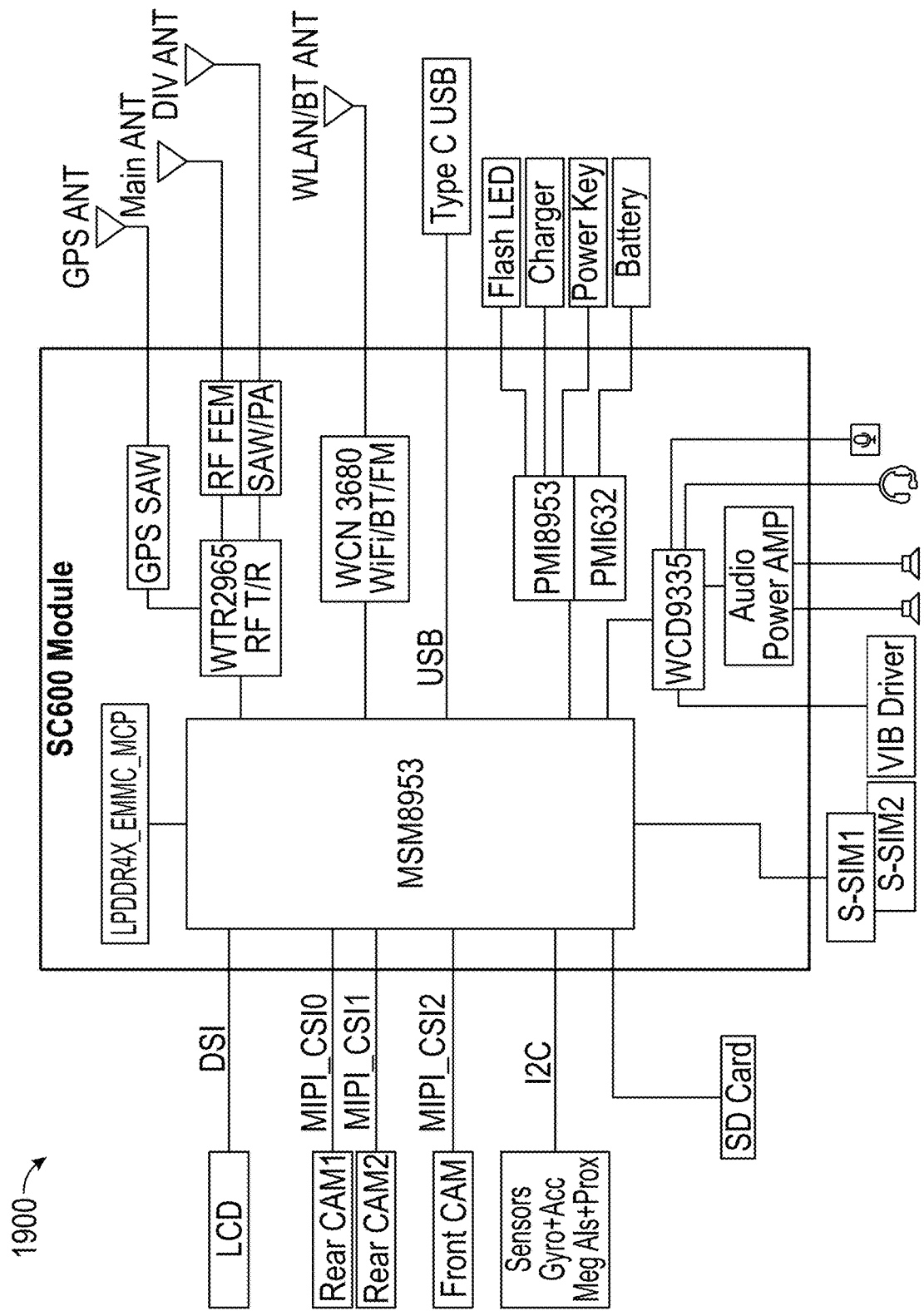
FIG. 19 illustrates a second example device-level implementation of a dual-SIM dual-data active wireless device in accordance with certain embodiments of the present disclosure.

FIG. 19 illustrates a second example device-level implementation of a dual-SIM dual-data active wireless device 1900 in accordance with certain embodiments of the present disclosure. The wireless device 1900 connects the diversity antenna to a RF FEM, which is turn communicates with the transceiver. Thus, in certain embodiments, the wireless device 1900 can receive data packets from the diversity antenna enabling the wireless device 1900 to receive data from two cellular networks associated with two SIM cards.

Additional Embodiments

Certain aspects of the present disclosure relate to a wireless device configured to maintain communication channels over multiple data networks with each data network configured using a different communication technology or set of frequency bands. The wireless device may include: a first primary antenna configured to transmit signals of a first transmit band and receive signals of a first receive band, and to transmit signals of a second transmit band and received signals of a second transmit band; a first diversity antenna configured to receive the signals of the first receive band, and receive the signals of the second receive band; a first radio frequency subsystem in electrical communication with the first primary antenna and the first diversity antenna, the first radio frequency subsystem configured to decode the signals of the first receive band and to decode the signals of the second receive band; a second radio frequency subsystem in electrical communication with the first diversity antenna, the second radio frequency subsystem configured to decode the signals of the first receive band and to decode the signals of the second receive band; and a hardware processor in electrical communication with a first subscriber identity module, a second subscriber identity module, the first radio frequency subsystem, and the second radio frequency subsystem, wherein the first subscriber identity module is associated with a first wireless network that supports the first transmit band and the first receive band, and the second subscriber identity module is associated with a second wireless network that supports the second transmit band and the second receive band, and wherein the hardware processor is configured to control whether the first subscriber identity module or the second subscriber module uses the first radio frequency subsystem to communicate at a particular time period.

The wireless device of the preceding paragraph can include any combination or sub-combination of the following features: where the wireless device further includes a first modem connected between the first radio frequency subsystem and the hardware processor, the first modem configured to transmit a packet using the first primary antenna to the first wireless network or the second wireless network; where the first modem is configured to determine whether the packet is a voice packet or a data packet; where the wireless device further includes: a first modem connected between the first radio subsystem and the hardware processor, the first modem configured to transmit a packet using the first primary antenna to one of the first wireless network or the second wireless network; and a second modem connected to the hardware processor, the second modem configured to transmit the packet using a second primary antenna; where the second modem is integrated with a second hardware processor configured to manage communication with a third wireless network; where the hardware processor serves as a primary device and the second hardware processor serves as a secondary device in a primary/secondary communication model; where the second modem is connected to the hardware processor via an auxiliary port of the hardware processor; where the wireless device further includes a communication hub configured to connect the second modem to the hardware processor; where the communication hub connects between an external data transfer or charging port of the wireless device and a data transfer or charging port of the hardware processor; where the second radio frequency subsystem is configured to receive the signals of the first receive band or the signals of the second receive band, and wherein the second radio frequency subsystem does not transmit signals; where the wireless device further includes a tuner in electrical communication with the first radio frequency subsystem, the first tuner configured to determine whether a received signal is a signal of a first channel access method or a signal of a second channel access method; where the first channel access method comprises one of code-division multiple access, wideband code-division multiple access, or time-division multiple access, and the second channel access method comprises one of code-division multiple access, wideband code-division multiple access, or time-division multiple access; where the hardware processor is further configured to determine a first signal strength of a connection with the first wireless network and a second signal strength of a connection with the second wireless network based at least in part on the received signals of the first receive band, and the received signals of the second receive band; where the hardware processor is further configured to determine whether to communicate with the first wireless network or the second wireless network based at least in part on the first signal strength or the second signal strength; and where the first wireless network is implemented using a first communication technology and is associated with a first service provider, and the second wireless network is implemented using a second communication technology and is associated with a second service provider.

Certain additional aspects of the present disclosure relate to a method of communicating over multiple cellular networks. The method may be performed by a hardware processor of a wireless device configured to communicate with a first cellular network over a first frequency band and a second cellular network over a second frequency band. The method may include: receiving, via a first primary antenna of the wireless device, a first signal of the first frequency band from the first cellular network, wherein the first cellular network is associated with a first subscriber identity module of the wireless device and the second cellular network is associated with a second subscriber identity module of the wireless device, and wherein the first subscriber identity module is designated for transmission of data packets; receiving, via a first diversity antenna of the wireless device, a second signal of the second frequency band from the second cellular network; determining a first signal strength associated with the first cellular network based at least in part on the first signal; determining a second signal strength associated with the second cellular network based at least in part on the second signal; determining that the second signal strength exceeds the first signal strength; and transmitting first data packets via the first primary antenna to a target system over the second cellular network by designating the second subscriber identity module as the active subscriber identity module for transmitting the first data packets and designating the first subscriber identity module as not for transmitting the first data packets.

The method of the preceding paragraph can include any combination or sub-combination of the following features: where the first signal and the second signal are received during a first time period; where the method further includes: receiving, at a second time period, a third signal of the first frequency band from the first cellular network; receiving, at the second time period, a fourth signal of the second frequency band from the second cellular network; determining a third signal strength associated with the first cellular network based at least in part on the third signal;

determining a fourth signal strength associated with the second cellular network based at least in part on the fourth signal; determining that the third signal strength exceeds the fourth signal strength; and transmitting second data packets via the first primary antenna to the target system over the first cellular network by designating the first subscriber identity module as the active subscriber identity module for transmitting the second data packets and designating the second subscriber identity module as not for transmitting the second data packets; where the first data packets are associated with non-voice data, and where the method further includes: obtaining second data packets from an application; determining that the second data packets comprise voice data associated with a call to a destination wireless device; and transmitting the second data packets over the first cellular network associated with the first subscriber identity module while continuing to transmit data packets associated with non-voice data over the second cellular network; and where the method further includes: receiving via a second primary antenna of the wireless device, a third signal of a third frequency band associated with a third cellular network; determining a third signal strength associated with the third cellular network based at least in part on the third signal; determining that the third signal strength exceeds the second signal strength; transmitting second data packets associated with a first priority over the third cellular network; and transmitting the first data packets over the second cellular network, wherein the first data packets are associated with a second priority that is lower than the first priority.

Yet certain additional aspects of the present disclosure relate to a method for dynamically routing calls on a first network implementing a first network protocol to a second network implementing a second network protocol. The method may include: receiving a call request generated by a user device via a first network of a first communications network provider; determining that the first user device supports a first network protocol and a second network protocol; determining a first measurement of a network characteristic for the first network associated with the first communications network provider, wherein the first network implements the first network protocol; identifying a second network associated with a second communications network provider, wherein the second network implements the second network protocol; determining a second measurement of the network characteristic for the second network associated with the second communications network provider; determining that the second measurement exceeds the first measurement by a threshold amount; and routing the call to the second network associated with the second communications network provider using the second network protocol based at least in part on the determination that the second measurement exceeds the first measurement by the threshold amount.

The method of the preceding paragraph can include any combination or sub-combination of the following features: where the first network protocol is a Global System for Mobile Communications (GSM) protocol and the second network protocol is a Code-Division Multiple Access (CDMA) protocol; where the first network protocol is associated with a first SIM card and the second network protocol is associated with a second SIM card; where routing the call to the second network comprises providing the user device with a command to complete the call using the second network; where the network characteristic, includes at least one of: jitter, latency, packet loss, an answer/seizure ratio, a call clarity rating, a dropped call rate, a network effectiveness ratio, or a post dial delay; where the network characteristic comprises a signal strength, and wherein the first measurement comprises a first signal strength between the user device and the first network, and the second measurement comprises a second signal strength between the user device and the second network; where the network characteristic comprises a signal strength, and wherein the first measurement comprises a first signal strength between a call destination device and the first network, and the second measurement comprises a second signal strength between the call destination device and the second network; where the method further includes identifying a geolocation of the user device; determining that the user device is within a particular coverage area for the second network; and routing the call to the second network based at least in part on the determination that the user device is within the particular coverage area; where the method further includes assessing historical data for the user device; generating a call profile for the user device based at least in part on the historical data, wherein the call profile indicates a probability that calls satisfying one or more criteria are completed using a particular network; and routing the call to the second network based at least in part on the call profile; where the one or more criteria comprises one or more of a location of the user device, a location of a user being called by the user device, a time of day, a particular user being called by the user device, a destination network used by a device of the particular user, or a destination network provider of the destination network; and where determining the first measurement and the second measurement of the network characteristic comprises: transmitting a request to the user device for the network characteristic; and receiving the first measurement of the network characteristic with respect to the first network and the second measurement of the network characteristic with respect to the second network from the user device.

Other Implementation Details

A number of embodiments have been described herein. It should be understood that where described embodiments are not mutually exclusive, each of the embodiments described herein can be combined with one or more of the other embodiments described herein. Any structure, material, function, method, or step illustrated or described in connection with any embodiment in the specification can be used instead of or in combination with any other structure, material, function, method, or step illustrated or described in connection with any other embodiment in the specification. Furthermore, no features, steps, structures, or methods disclosed in the specification are essential or indispensable.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as application-specific electronic hardware, computer software executed by computer hardware, or a combination of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. For example, the dynamic routing system 108 can be implemented by one or more computer systems or by a computer system including one or more processors. Moreover, the described functionality can be implemented in varying ways for each particular application of the systems described herein, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of communicating over multiple cellular networks, the method comprising:
   by a hardware processor of a wireless device configured to communicate with a first cellular network over a first frequency band and a second cellular network over a second frequency band:
   receiving, via a first primary antenna of the wireless device, a first signal of the first frequency band from the first cellular network, wherein the first cellular network is associated with a first subscriber identity module of the wireless device and the second cellular network is associated with a second subscriber identity module of the wireless device, and wherein the first subscriber identity module is designated for transmission of data packets;
   receiving, via a first diversity antenna of the wireless device, a second signal of the second frequency band from the second cellular network;
   determining a first signal strength associated with the first cellular network based at least in part on the first signal;
   determining a second signal strength associated with the second cellular network based at least in part on the second signal;
   determining that the second signal strength exceeds the first signal strength;
   transmitting first data packets via the first primary antenna to a target system over the second cellular network by designating the second subscriber identity module as an active subscriber identity module for transmitting the first data packets and designating the first subscriber identity module as not for transmitting the first data packets, wherein the first data packets identify an origin of the first data packets as being associated with a shadow number that substitutes at least for a first number associated with the first subscriber identity module and for a second number associated with the second subscriber identity module, and wherein the first signal and the second signal are received during a first time period;
   receiving via a second primary antenna of the wireless device, a third signal of a third frequency band associated with a third cellular network;
   determining a third signal strength associated with the third cellular network based at least in part on the third signal;
   determining that the third signal strength exceeds the second signal strength;
   transmitting second data packets associated with a first priority over the third cellular network; and
   continue transmitting the first data packets over the second cellular network, wherein the first data packets are associated with a second priority that is lower than the first priority.

2. The method of claim 1, wherein the first data packets are associated with non-voice data, and wherein the method further comprises:

obtaining second data packets from an application;
determining that the second data packets comprise voice data associated with a call to a destination wireless device; and
transmitting the second data packets over the first cellular network associated with the first subscriber identity module while continuing to transmit data packets associated with non-voice data over the second cellular network.

3. A method of communicating over multiple cellular networks, the method comprising:

by a hardware processor of a wireless device configured to communicate with a first cellular network over a first frequency band and a second cellular network over a second frequency band:
receiving, via a first primary antenna of the wireless device, a first signal of the first frequency band from the first cellular network, wherein the first cellular network is associated with a first subscriber identity module of the wireless device and the second cellular network is associated with a second subscriber identity module of the wireless device, and wherein the first subscriber identity module is designated for transmission of data packets;
receiving, via a first diversity antenna of the wireless device, a second signal of the second frequency band from the second cellular network;
determining a first signal strength associated with the first cellular network based at least in part on the first signal;
determining a second signal strength associated with the second cellular network based at least in part on the second signal;
determining that the second signal strength exceeds the first signal strength;
transmitting first data packets via the first primary antenna to a target system over the second cellular network by designating the second subscriber identity module as an active subscriber identity module for transmitting the first data packets and designating the first subscriber identity module as not for transmitting the first data packets, wherein the first data packets identify an origin of the first data packets as being associated with a shadow number that substitutes at least for a first number associated with the first subscriber identity module and for a second number associated with the second subscriber identity module, and wherein the first signal and the second signal are received during a first time period;
receiving, at a second time period, a third signal of the first frequency band from the first cellular network;
receiving, at the second time period, a fourth signal of the second frequency band from the second cellular network;
determining a third signal strength associated with the first cellular network based at least in part on the third signal;
determining a fourth signal strength associated with the second cellular network based at least in part on the fourth signal;
determining that the third signal strength exceeds the fourth signal strength; and
transmitting second data packets via the first primary antenna to the target system over the first cellular network by designating the first subscriber identity module as the active subscriber identity module for transmitting the second data packets and designating the second subscriber identity module as not for transmitting the second data packets.

4. The method of claim 3, further comprising:
receiving via a second primary antenna of the wireless device, a third signal of a third frequency band associated with a third cellular network;
determining a third signal strength associated with the third cellular network based at least in part on the third signal;
determining that the third signal strength exceeds the second signal strength;
transmitting second data packets associated with a first priority over the third cellular network; and
transmitting the first data packets over the second cellular network, wherein the first data packets are associated with a second priority that is lower than the first priority.

5. A dynamic routing system comprising:
a memory configured to store specific computer-executable instructions, and
a hardware processor in communication with the memory and configured to execute the specific computer-executable instructions to at least:
receive a packet associated with a call from a wireless device associated with an origin caller;
identify an origin number associated with the call from the packet;
determine that the origin number is associated with a shadow number of the origin caller;
determine a plurality of phone numbers associated with the shadow number;
identify a plurality of call carriers, wherein each call carrier of the plurality of call carriers is associated with a different number of the plurality of phone numbers;
select a call carrier from the plurality of call carriers based at least in part on one or more routing parameters; and
route the packet over a network of the selected call carrier while maintaining the shadow number as the origin number for display at a device associated with a destination target of the packet.

6. The dynamic routing system of claim 5, wherein the packet is one of a data packet or a voice packet.

7. The dynamic routing system of claim 5, wherein the device is further configured to execute the specific computer-executable instructions to at least:
determine a destination number for the packet, the destination number associated with the destination target of the packet;
determine that the destination number is associated with a second shadow number, wherein the shadow number is associated with the origin caller and the second shadow number is associated with a target user associated with the destination target;
substitute the destination number with the second shadow number; and
route the packet over the network of the selected call carrier using the second shadow number in place of the destination number.

8. A wireless device configured to maintain communication channels over multiple data networks with each data network configured using a different communication technology or set of frequency bands, the wireless device comprising:
- a first primary antenna configured to receive a first signal of a first frequency band from a first cellular network, wherein the first cellular network is associated with a first subscriber identity module of the wireless device and a second cellular network is associated with a second subscriber identity module of the wireless device, and wherein the first subscriber identity module is designated for transmission of data packets;
- a first diversity antenna configured to receive a second signal of a second frequency band from the second cellular network;
- a second primary antenna configured to receive a third signal of a third frequency band associated with a third cellular network; and
- a hardware processor configured to:
  - determine a first signal strength associated with the first cellular network based at least in part on the first signal;
  - determine a second signal strength associated with the second cellular network based at least in part on the second signal;
  - determine that the second signal strength exceeds the first signal strength;
  - transmit first data packets via the first primary antenna to a target system over the second cellular network by designating the second subscriber identity module as an active subscriber identity module for transmitting the first data packets and designating the first subscriber identity module as not for transmitting the first data packets, wherein the first data packets identify an origin of the first data packets as being associated with a shadow number that substitutes at least for a first number associated with the first subscriber identity module and for a second number associated with the second subscriber identity module, and wherein the first signal and the second signal are received during a first time period;
  - determine a third signal strength associated with the third cellular network based at least in part on the third signal;
  - determine that the third signal strength exceeds the second signal strength;
  - transmit second data packets associated with a first priority over the third cellular network; and
  - continue to transmit the first data packets over the second cellular network, wherein the first data packets are associated with a second priority that is lower than the first priority.

9. The wireless device of claim 8, further comprising:
- a first radio frequency subsystem in electrical communication with the first primary antenna and the first diversity antenna, the first radio frequency subsystem configured to decode signals of the first frequency band and to decode signals of the second frequency band; and
- a second radio frequency subsystem in electrical communication with the first diversity antenna, the second radio frequency subsystem configured to decode the signals of the first frequency band and to decode the signals of the second frequency band.

10. The wireless device of claim 9, further comprising:
- a first modem connected between the first radio frequency subsystem and the hardware processor, the first modem configured to transmit a packet using the first primary antenna to one of the first cellular network or the second cellular network; and
- a second modem connected to the hardware processor, the second modem configured to transmit the packet using a second primary antenna.

11. The wireless device of claim 10, wherein the second modem is integrated with a second hardware processor configured to manage communication with a third cellular network.

12. The wireless device of claim 10, wherein the second modem is connected to the hardware processor via an auxiliary port of the hardware processor.

13. The wireless device of claim 10, further comprising a communication hub configured to connect the second modem to the hardware processor.

14. The wireless device of claim 13, wherein the communication hub electrically connects between an external data transfer or charging port of the wireless device and the hardware processor.

15. The wireless device of claim 8, wherein the shadow number comprises one of the first number or the second number.

16. The wireless device of claim 8, wherein the first cellular network is implemented using a first communication technology and is associated with a first service provider, and the second cellular network is implemented using a second communication technology and is associated with a second service provider.

* * * * *